US011635880B2

(12) United States Patent
Rajbhandari et al.

(10) Patent No.: US 11,635,880 B2
(45) Date of Patent: Apr. 25, 2023

(54) CONTENT ANIMATION CUSTOMIZATION BASED ON VIEWPORT POSITION

(71) Applicant: Google LLC, Mountain View, CA (US)

(72) Inventors: Nivesh Rajbhandari, Palo Alto, CA (US); Mariko Ogawa, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/758,654

(22) PCT Filed: Oct. 23, 2019

(86) PCT No.: PCT/US2019/057625
§ 371 (c)(1),
(2) Date: Apr. 23, 2020

(87) PCT Pub. No.: WO2021/080580
PCT Pub. Date: Apr. 29, 2021

(65) Prior Publication Data
US 2021/0132775 A1    May 6, 2021

(51) Int. Cl.
*G06F 17/00* (2019.01)
*G06F 3/04842* (2022.01)
(Continued)

(52) U.S. Cl.
CPC ...... *G06F 3/04842* (2013.01); *G06F 3/04847* (2013.01); *G06T 13/00* (2013.01)

(58) Field of Classification Search
CPC .. G06F 3/04842; G06F 3/04847; G06T 13/00
(Continued)

(56) References Cited

U.S. PATENT DOCUMENTS 5,818,462 A * 10/1998 Marks ............... G06T 13/20
345/473
6,469,702 B1 * 10/2002 Sheasby ............ G06F 3/04845
345/442
(Continued)

FOREIGN PATENT DOCUMENTS

JP    2012525624    10/2012
JP    2015060536    3/2015
(Continued)

OTHER PUBLICATIONS

Xiao, 'The Technical Study of Integration of Flash Media in Power Point', 2010 IEEE (Year: 2010).*
(Continued)

*Primary Examiner* — Stephen S Hong
*Assistant Examiner* — Matthew J Ludwig
(74) *Attorney, Agent, or Firm* — Dority & Manning, P.A.

(57) ABSTRACT

Systems, methods and computer-readable storage media that be used to configure an animated content item based on a position of the animated content item within a viewport of a computing device upon which the animated content item is presented. One method includes providing, to a first computing device, an animation configuration interface configured to allow selection via the first computing device of a position-dependent setting comprising a position within the viewport at which a property of the animated content item changes. The method further includes receiving, by a second computing device, the position-dependent setting and configuring the property of the animated content item based on the position-dependent setting such that the animated content item is configured to change the property when presented within a viewport of the second computing device at the position of the viewport in accordance with the position-dependent setting.

22 Claims, 10 Drawing Sheets

(51) Int. Cl.
*G06F 3/04847* (2022.01)
*G06T 13/00* (2011.01)

(58) Field of Classification Search
USPC .............................. 715/726, 762, 787, 771
See application file for complete search history.

(56) References Cited

U.S. PATENT DOCUMENTS

| | | | | |
|---|---|---|---|---|
| 6,559,860 | B1* | 5/2003 | Hamilton | G06T 11/60 715/848 |
| 2005/0091615 | A1* | 4/2005 | Suzuki | G06F 8/38 715/863 |
| 2006/0031773 | A1* | 2/2006 | Uchida | G06F 40/103 715/760 |
| 2007/0036456 | A1* | 2/2007 | Hooper | G06T 5/008 382/274 |
| 2007/0132779 | A1* | 6/2007 | Gilbert | G06F 8/20 345/619 |
| 2010/0275139 | A1* | 10/2010 | Hammack | G05B 19/0426 715/763 |
| 2011/0131496 | A1* | 6/2011 | Abram | G11B 27/105 715/730 |
| 2013/0067391 | A1* | 3/2013 | Pittappilly | G06F 3/0482 715/781 |
| 2013/0093793 | A1* | 4/2013 | Edwards | G06F 3/0482 345/660 |
| 2013/0120460 | A1* | 5/2013 | Adams | G06F 3/0485 345/660 |
| 2013/0127877 | A1* | 5/2013 | Blas, Jr. | G06T 13/00 345/474 |
| 2014/0092424 | A1* | 4/2014 | Grosz | G06F 3/04845 358/1.15 |
| 2014/0195921 | A1* | 7/2014 | Grosz | G06Q 30/0601 715/738 |
| 2014/0223271 | A1* | 8/2014 | Racklyeft | G06T 13/80 715/201 |
| 2014/0289017 | A1* | 9/2014 | Trenkle | G06Q 10/067 705/7.33 |
| 2015/0029197 | A1* | 1/2015 | Almosnino | G06T 13/80 345/474 |
| 2015/0089542 | A1* | 3/2015 | Sumitomo | H04N 21/812 725/38 |
| 2016/0065992 | A1* | 3/2016 | Krishna | G06F 9/451 345/473 |
| 2016/0110901 | A1* | 4/2016 | Connolly | G06F 3/04842 345/661 |
| 2017/0206064 | A1* | 7/2017 | Breazeal | G06F 8/36 |
| 2017/0336926 | A1* | 11/2017 | Chaudhri | H04L 51/22 |
| 2018/0336717 | A1* | 11/2018 | Liu | G06T 13/00 |
| 2019/0139288 | A1* | 5/2019 | Kelly | G06F 3/04847 |
| 2020/0005532 | A1* | 1/2020 | Kovar | G06F 16/972 |
| 2021/0200166 | A1* | 7/2021 | Nakajima | G05B 11/42 |

FOREIGN PATENT DOCUMENTS

| | | |
|---|---|---|
| JP | 6224786 | 11/2017 |
| JP | 6556308 | 8/2019 |
| WO | WO 2010/071666 | 6/2010 |

OTHER PUBLICATIONS

Hua, Contextual Internet Multimedia Advertising, Processings of the IEEE, 2010 (Year: 2010).*

International Search Report and Written Opinion for PCT Appln. Ser. No. PCT/US2019/057625 dated Jul. 16, 2020, (14 pages).

* cited by examiner

CONTENT ANIMATION CUSTOMIZATION BASED ON VIEWPORT POSITION

CROSS-REFERENCE TO RELATED APPLICATIONS

The present application is a National Stage Application, filed under 35 U.S.C. 371, of International Patent Application No. PCT/US2019/057625 filed on Oct. 23, 2019 titled "CONTENT ANIMATION CUSTOMIZATION BASED ON VIEWPORT POSITION," the entirety of which is incorporated by reference herein.

BACKGROUND

In a computer networked environment such as the internet, entities such as people or companies provide content items for public display in different forms in order to attract consumers. Entities that provide the content items may desire to configure the presentation of the content items.

SUMMARY

Some implementations relate to a method for configuring an animated content item. The method includes configuring an animated content item based on a position of the animated content item within a viewport of a computing device upon which the animated content is presented. The method includes providing, to a first computing device, an animation configuration interface configured to allow selection via the first computing device of a position-dependent setting comprising a position within the viewport at which a property of the animated content item changes. Further, the method includes receiving, by a second computing device, the position-dependent setting and configuring the property of the animated content item based on the position-dependent setting such that the animated content item is configured to change the property when presented within a viewport of the second computing device at the position of the viewport in accordance with the position-dependent setting.

In some implementations, the position-dependent setting comprises a position within the viewport at which an animation of the animated content item begins. The animation configuration interface is configured to allow selection of a second position-dependent setting. The second position-dependent setting comprises a second position within the viewport at which the animation ends. Configuring the property of the animated content item comprises causing the animation of the animated content item to change as the animated content item moves through the viewport between the position and the second position. The animation configuration interface is configured to allow selection of a third position-dependent setting comprising a third position within the viewport.

In some implementations, providing the animation configuration interface comprises causing the animation configuration interface to allow selection via the first computing device of the position-dependent setting by at least one of a sliding interface or a percentage input. The animation configuration interface comprises a graphical representation of the position of the animated content item within the viewport, the graphical representation being movable to select the position within the viewport at which the property of the animated content item changes. The property comprises a rotation of the animated content item. The position-dependent setting comprises a position within the viewport at which rotation of the animated content item begins. The animation configuration interface is configured to allow selection of a second position within the viewport at which the rotation of the animated content item ends.

In some implementations, the animated content item comprises either an image animation or a video animation.

In some implementations, the method further comprises receiving, by a third computing device, the position-dependent setting and configuring the property of the animated content item based on the position-dependent setting such that the animated content item is configured to change the property when presented within a viewport of the third computing device at the position of the viewport in accordance with the position-dependent setting.

In some implementations, the method further comprises determining a position of the animated content item relative to the viewport of the second computing device, determining that the position of the animated content item relative to the viewport matches the position of the viewport in accordance with the position-dependent setting, and changing the property of the animated content item.

In some implementations the property includes a value that is interpolated based on the position of the animated content item within the viewport.

Some implementations relate to a system with at least one computing device operably coupled to at least one memory. The computing device can be configured to provide, to a first computing device, an animation configuration interface configured to allow selection via the first computing device of a position-dependent setting comprising a position within the viewport at which a property of the animated content item changes. Further, the computing device can be configured to receive, from the first computing device, the position-dependent setting and provide, to a second computing device, the position-dependent setting, wherein the second computing device configures the property of the animated content item based on the position-dependent setting such that the animated content item is configured to change the property when presented within a viewport of the second computing device at the position of the viewport in accordance with the position-dependent setting.

In some implementations, the animation configuration interface is configured to allow selection of a second position-dependent setting. The animation configuration interface is configured to allow selection of a third position-dependent setting. The animated content item comprises either an image animation or a video animation.

Some implementations relate to one or more computer-readable storage media having instructions stored thereon that, when executed by at least one processor, cause the at least one processor to perform operations including receiving, by a first computing device from a content management system, an animation configuration interface configured to allow selection of a position-dependent setting comprising a position within the viewport at which a property of the animated content item changes. Further, the operations include receiving, by a second computing device, the position-dependent setting and configuring the property of the animated content item based on the position-dependent setting such that the animated content item is configured to change the property when presented within a viewport of the second computing device at the position of the viewport in accordance with the position-dependent setting.

In some implementations, configuring the position-dependent setting is further configured to allow selection of a plurality of properties associated with the position-dependent setting comprising a position within the viewport at which the plurality of properties of the animated content item changes.

In some implementations, the first computing device is configured to select a second position-dependent setting comprising a second position within the viewport, select a third position-dependent setting comprising a third position within the viewport, and select a fourth position-dependent setting comprising a portion position within the viewport.

Optional features relating to the systems and methods, described above and below, may be combined in any suitable way, and may also be combined with either the system implementation or the computer-readable storage media implementation.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

Figure 1A:
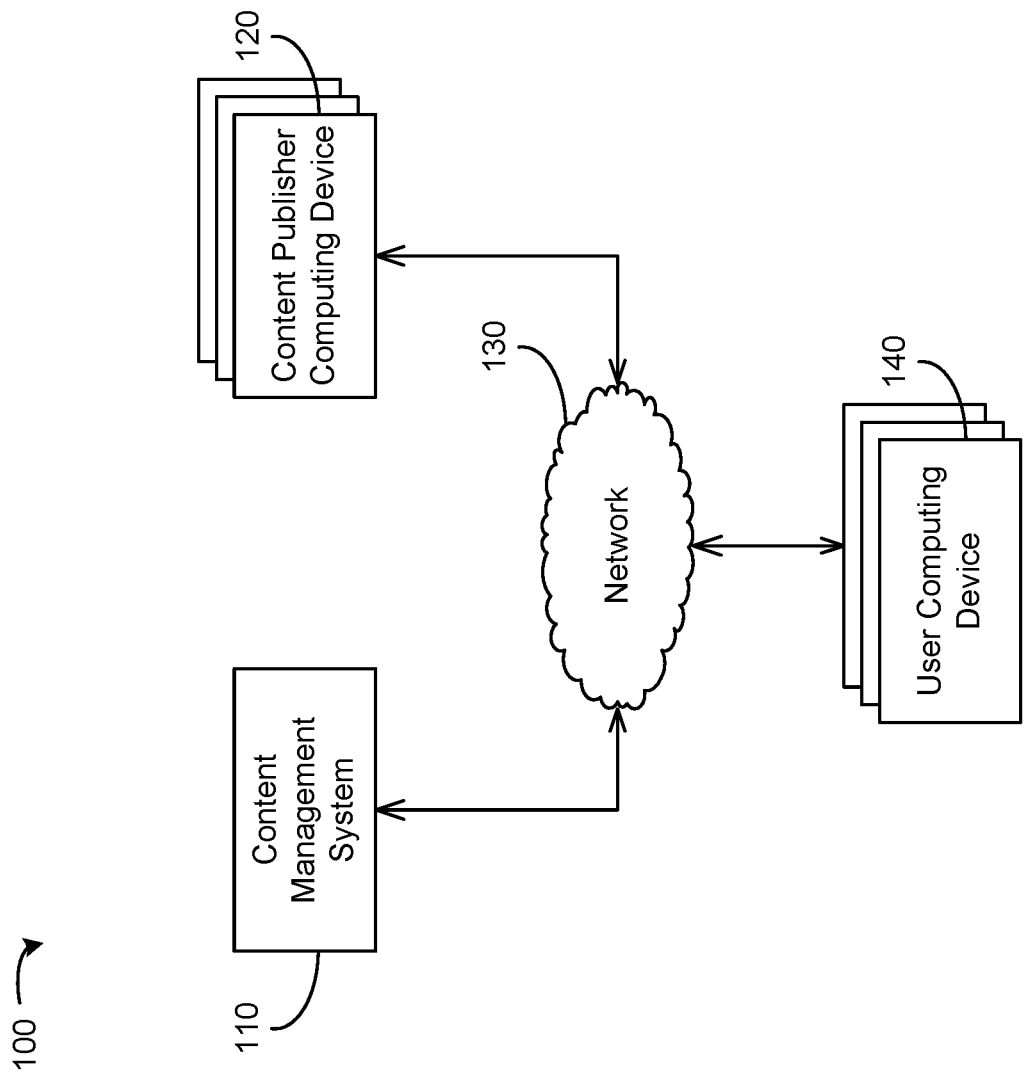
FIG. 1A is a block diagram depicting an implementation of a system for providing information via a network, according to an illustrative implementation.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the FIGURES, the systems and methods relate generally to configuring an animated content item based on a position of the animated content item within a viewport of a computing device upon which the animated content item is presented. In some embodiments, the causal configuration of the animated content item can include configuring position-dependent settings that include positions within the viewport at which a property of the animated content item changes. The positions within the viewport can further include the position at which a property of the animated content item begins, a second position at which the animated content item ends, and a third position.

In many systems, the animated content item begins presenting within the viewport when a scroll event is received by the computing device and after the animated content item reaches the viewport. However, the ability to control aspects of the animation based on location within the viewport, such as when the animated content item begins presenting within the viewport by delaying the animated content item from presenting until the animated content item is completely inside the viewport, reaches a certain point inside the viewport, or is directly in the middle of the device's viewport, provides producers of animated content items enhanced flexibility on how animated content items are presented within the viewport of the computing device. This causal approach allows producers of animated content items to produce significant improvements to the engagement and noticeability of animated content items when presented through the viewport of the computing device. Therefore, aspects of the present disclosure address problems in application development by providing an improved development tool for the production of animated content items.

Accordingly, the present disclosure is directed to systems and methods for configuring the animated content item based on the position of the animated content item within the viewport of the computing device upon which the animated content item is presented. That is, the property that is changed when the animated content item reaches the position may be to start the animation. In some implementations, the described systems and methods involve utilizing an animation configuration interface. The animation configuration interface allows selection of the position-dependent settings by utilizing a graphical representation of a position of the animated content item within the viewport that is movable to select the position within the viewport at which the property of the animated content item changes. This can also be accomplished by adjusting a sliding interface or by inputting a value directly into a corresponding percentage input field. This process can subsequently be performed for multiple positions, such as a second position and a third position. In the present disclosure the third position is generally defined as dividing the position and the second position. Mapping the animated content item to the position of the animated content item within the viewport leads to an improvement in the human-machine interaction process as the producer is provided with improved control over the animated content item. Furthermore, said mapping can ensure, for example, that the animated content item is presented in its entirety as a user scrolls (at their own pace) through a webpage hosting the animated content item, further improving the end user experience. Additionally, said mapping provides the end user with control over how the animation is executed, providing an improved user interface.

In some implementations, a second computing device receives the position-dependent setting of the animated content item from a first computing device. The second computing device subsequently configures the property of animated content item based on the received position-dependent setting such that the animated content item is configured to change the property when presented within a viewport at the position of the viewport in accordance with the received position-dependent setting. This process can subsequently be performed with the second position and the third position such that there are three positions within the viewport that are each configured with a position-dependent setting where the property of the animated content item changes. For example, during presentation of the animated content item, the second computing device may repeatedly determine a position of the animated content item relative to the viewport. For example, a user may be scrolling through a feed in which the animated content item is present, causing the position of the animated content item relative to the viewport to change as the user scrolls. When it is determined that the animated content item has reached the specified position of the viewport in accordance with the position-dependent setting, a property of the animated content item is changed. The position-dependent setting may be transmitted to the second computer device either separately, or with the animated content item. In another example, data representative of the animated content item may be transmitted to the second computing device, where the data is configured to cause the second computing device to display an animation of the animated content item within the viewport in accordance with the property of the animated content item based on the position-dependent setting. That is, the data representative of the animated content item may comprise the one or more position-dependent settings which are used to configure the animated content item. Additionally, each position-dependent setting may be transmitted to the second computing device at the same time.

In some implementations, the third position enables the animated content item to interchange the property of the animated content item in either direction of the scroll event. For example, the third position could enable the animated content item to not begin presenting until the third position is reached by the animated content item. In another example, the animated content item may utilize a rotate property that rotates the animated content item clockwise, and once the third position is reached, start rotating the animated content item counter-clockwise. This configuring of animated content items of the present disclosure outperforms configuring of animated content items that are not causal since the present configuring of animated content items can operate in either direction (e.g., scroll event scrolling up or down on a presented article within the viewport of the computing device) during the scroll event. Additionally, in some implementations, there are one or more properties of the animated content item. The one or more properties of the animated content item can be individually configured.

In some implementations, the values of the one or more properties of the animated content item respective to the viewport are interpolated based on a viewport monitoring library. The viewport monitoring library can be configured to cause the computing device to identify a plurality of coordinate values of the animated content item based on the relative position of the animated content item to the viewport. For instance, the viewport monitoring library can be configured to receive information from the computing device indicative of a movement (e.g., up or down) of a scroll tab of a scroll bar associated with the viewport or the animated content item. In some implementations, the viewport monitoring library can be configured to monitor a position of the scroll tab relative to the scroll bar or relative to the viewport based on, for instance, scroll information received from the computing device. That is, state information relating to the position of the animated content item within an application is acquired and used in the subsequent determining of the values of the one or more properties of the animated content item.

Referring now to FIG. 1A, a block diagram depicting an implementation of a system 100 for providing information via a network 130, according to an illustrative implementation. The network 130 may include a local area network (LAN), wide area network (WAN), a telephone network, such as the Public Switched Telephone Network (PSTN), a wireless link, an intranet, the Internet, or combinations thereof. The system 100 can also include at least one data processing system or processing circuit, such as a content management system 110. The content management system can communicate via the network 130, for example with a content publisher computing device 120, and/or user computing device 140. The content management system 110 can also include at least one logic device, such as a computing device having a processing circuit configured to execute instructions stored in a memory device to perform one or more operations described herein. The processing circuit may include a microprocessor, an application specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, HTML, Java®, JavaScript®, Perl®, Python®, Visual Basic®, and XML. In addition to the processing circuit, the content management system 110 may include one or more databases (e.g., 116) configured to store data. The content management system 110 may also include an interface (e.g., animation configuration interface 112) configured to receive data via the network 130 and to provide data from the content management system 110 to any of the other systems and devices on the network 130. The content management system 110 can include one or more libraries (e.g., viewport monitoring library 116). Additional details relating to the functions of the content management system 110 are provided herein with respect to FIG. 2.

The content publisher computing device 120 may be any kind of computing device, including, for example, a desktop computer, a laptop or notepad computer, a mobile device such as a tablet or electronic pad, a personal digital assistant, a smart phone, a video gaming device, a television or television auxiliary box (also known as a set-top box), a kiosk, a hosted virtual desktop, or any other such device capable of exchanging information via the network 130. The content publisher computing device 120 can be configured to exchange information with other systems and devices of FIG. 1 via the network 130. The content publisher computing device 120 may be any form of computing device that includes a processing circuit and a memory. The memory may store machine instructions that, when executed by the processing circuit, cause the processing circuit to perform one or more of the operations described herein. The memory may also store data to affect presentation of one or more resources, animated content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, JavaScript®, JSON, Perl®, HTML, HTML5, XML, Python®, and Visual Basic®.

The content publisher computing device 120 can execute a software application (e.g., a web browser or other application) to retrieve content from other computing systems and devices over network 130. Such an application may be configured to retrieve an animation configuration interface 112 from the content management system 110. In one implementation, the content publisher computing device 120 may execute a web browser application, which provides the interface (e.g., animation configuration interface 112) on a viewport of the content publisher computing device 120. The web browser application that provides the interface may operate by receiving input of a uniform resource locator (URL), such as a web address, from an input device (e.g., a pointing device, a keyboard, a touch screen, or another form of input device). In response, one or more processors of the content publisher computing device 120 executing the instructions from the web browser application may request data from another device connected to the network 130 referred to by the URL address (e.g., the content management system 110). The other device may then provide webpage data and/or other data to the content publisher computing device 120, which causes the interface to be presented by the viewport of the publisher computing device 120. Accordingly, the browser window presents the interface to facilitate user interaction with the interface.

The user computing device 140 may be any kind of computing device, including, for example, a desktop computer, a laptop or notepad computer, a mobile device such as a tablet or electronic pad, a personal digital assistant, a smart phone, a video gaming device, a television or television auxiliary box (also known as a set-top box), a kiosk, a hosted virtual desktop, or any other such device capable of exchanging information via the network 130. The user computing device 140 can be configured to exchange information with other systems and devices of FIG. 1 via the network 130. The user computing device 140 may be any form of computing device that includes a processing circuit and a memory. The memory may store machine instructions that, when executed by the processing circuit, cause the processing circuit to perform one or more of the operations described herein. The memory may also store data to affect presentation of one or more resources, animated content items, etc. on the computing device. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing processor with program instructions. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which processor can read instructions. The instructions may include code from any suitable computer programming language such as, but not limited to, ActionScript®, C, C++, C#, Java®, JavaScript®, JSON, Perl®, HTML, HTML5, XML, Python®, and Visual Basic®.

Still referring to FIG. 1A, the user computing device 140 can execute a software application (e.g., a web browser or other application) to retrieve content from other systems and devices over network 130. Such an application may be configured to retrieve one or more position-dependent settings from the content publisher computing device 120. In one implementation, the user computing device 140 may execute a web browser application which provides the one or more position-dependent settings such that an animated content item is configured to change one or more properties of the animated content item when presented within a viewport of the user computing device 140 at a position of the viewport in accordance with the one or more position-dependent settings. The web browser application that provides the position-dependent settings may operate by receiving input of a uniform resource locator (URL), such as a web address, from an input device (e.g., a pointing device, a keyboard, a touch screen, or another form of input device). In response, one or more processors of the user computing device 140 executing the instructions from the web browser application may request data from another device connected to the network 130 referred to by the URL address (e.g., content publisher computing device 120). The other device may then provide webpage data and/or other data to the user computing device 140, which causes the webpage to be presented by the viewport of the user computing device 140. Accordingly, the browser window presents the animated content item in accordance with the one or more retrieved position-dependent settings.

For example, the user computing device 140 can be configured to exchange information over the network 130 using protocols in accordance with the Open Systems Interconnection (OSI) layers, e.g., using an OSI layer-4 transport protocol such as the User Datagram Protocol (UDP), the Transmission Control Protocol (TCP), or the Stream Control Transmission Protocol (SCTP), layered over an OSI layer-3 network protocol such as Internet Protocol (IP), e.g., IPv4 or IPv6. In some implementations, the user computing device 140 includes one or more hardware elements for facilitating data input and data presentation, e.g., a keyboard, a display, a touch screen, a microphone, a speaker, and/or a haptic feedback device. In some implementations, the user computing device 140 includes buttons, e.g., function-specific buttons (e.g., audio device volume controls such as volume up, volume down, mute, etc.) and/or function agnostic buttons (e.g., a soft button that can be assigned specific functionality at a software level).

In some implementations, the user computing device 140 runs an operating system managing execution of software applications on the user computing device 140. In some implementations, the operating system is provided with the user computing device 140. In some implementations, the user computing device 140 executes a browser application (e.g., a web browser) capable of receiving data formatted according to the suite of hypertext application protocols such as the Hypertext Transfer Protocol (HTTP) and/or HTTP encrypted by Transport Layer Security (HTTPS).

In some such implementations, the browser facilitates interaction with one or more systems and devices via interfaces presented at the user computing device 140 in the form of one or more web pages. In some implementations, the browser application is provided to the user computing device 140. In some implementations, the user computing device 140 executes a custom application, e.g., a game or other application that interacts with systems and devices, e.g., the content management system 110 and/or the content publisher computing device 120. Interactions between the custom application and the content management system 110 may use standard protocols such as HTTP and HTTPS, or may use application-specific protocols, e.g., a custom application layer protocol implemented over a transport-layer protocol such as UDP, TCP, or SCTP. In some implementations, the user computing device 140 includes a tool for obtaining and/or installing additional applications (such as the custom application) on the user computing device 140. In some implementations, one or more of the systems and devices with which the user computing device 140 communicates supports a custom instruction set, e.g., an application programming interface (API), and the custom application executed on the user computing device 140 implements the API. An application can implement an API using, for example, a library or software development kit (SDK) provided to the application's developer.

The user computing device 140 can be configured to communicate (or exchanges data) with various systems and devices such as the content management system 110 and/or the content publisher computing device 120. In some implementations, the one or more of the systems and devices 110, 120, and 140 are implemented using special purpose logic circuitry, e.g., an application specific integrated circuit (ASIC). In some implementations, one or more of the systems and devices 110, 120, and 140 are implemented using a system on a chip (SoC) semiconductor device that includes at least one processor (or microprocessor) core. In some implementations, one or more of the systems and devices 110, 120, and 140 are implemented using a general purpose computing processor.

Figure 1B:
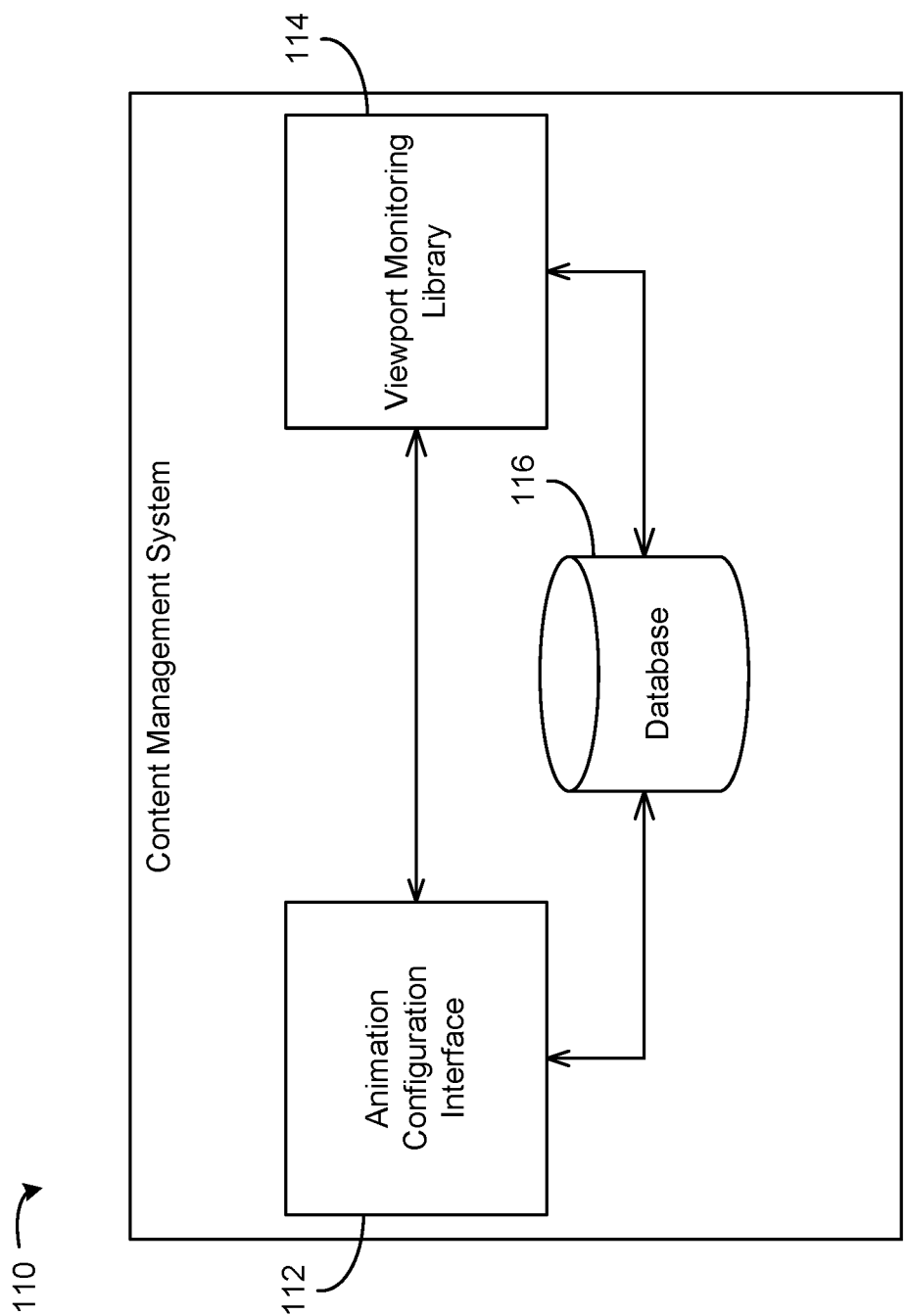
FIG. 1B is a block diagram depicting an implementation of a content management system, according to an illustrative implementation.

Referring now to FIG. 1B, block diagram depicting an implementation of a content management system 110 is shown, according to an illustrative implementation. The content management system 110 can be run or otherwise be executed on one or more processors of a computing device, such as those described below in FIG. 10. In broad overview, the content management system 110 can include an animation configuration interface 112, a viewport monitoring library 114, and a database 116. The animation configuration interface 112 can be provided to the content publisher computing device 120 for configuring animated content items. Generally, the animation configuration interface 112 can be rendered at the content publisher computing device 120 such that animated content items can be configured and provided to the user computing device 140 for presentation. For example, the content publisher (a user or human operator) using the content publisher computing device 120 can enter one or more position-dependent settings into the animation configuration interface 112. Each position-dependent setting can include a position within a viewport at which one or more properties of the animated content item change. Each property can be selected from an inventory (e.g., provided by the animation configuration interface 112 and/or database 116) or can be provided by the content publisher.

The animation configuration interface 112 can include a plurality of interfaces and properties, such as those described below in FIGS. 3, 4, 5, 6, 7, and 8. The animation configuration interface 112 can execute at the content publisher computing device 120, the content management system 110, or both to provide the animation configuration interface 112 at the content publisher computing device 120. In one implementation, the animation configuration interface 112 can be provided within a web browser. In another implementation, the content generation application 130 executes to provide the content management system 110 at the content publisher computing device 120 without utilizing the web browser.

In one implementation, an application executed by the content publisher computing device 120 can cause the web browser to display on a monitor or screen of the content publisher computing device 120. The web browser operates by receiving input of a uniform resource locator (URL) into a field from an input device (e.g., a pointing device, a keyboard, a touchscreen, or another form of input device). In response, the content publisher computing device 120 executing the web browser may request data such as from the database 116. The web browser may include other functionalities, such as navigational controls (e.g., backward and forward buttons). The content management system 110 may then execute the database 116 (or provide data from the database 116 to the content publisher computing device 120 for execution) to provide the animation configuration interface 112 at the content publisher computing device 120.

The viewport monitoring library 114 can be configured to cause the user computing device 140 to monitor a viewport of an application to append (e.g., modify the values for the one or more properties) one or more of the animated content items identified by the content publisher computing device 120. In some implementations, the viewport monitoring library 114 can be configured to cause the content management system 110 to monitor a viewport of an application to append (e.g., modify the values for the one or more properties) one or more of the animated content items identified by the content publisher computing device 120. The viewport monitoring library 114 can be configured to cause the user computing device 140 to identify an animated content item. In some implementations, the viewport monitoring library 114 can be configured to cause the content management system 110 to identify an animated content item. In some implementations, the animated content item can be included in the one or more position-dependent settings received by the content publisher computing device 120. In some implementations, the animated content item can be a document object model element (i.e., DOM). In some implementations, the animated content item can be a DOM element that can be rendered for presentation on the user computing device 140. In some implementations, the animated content item can be a visual representation of a DOM element that can be rendered for presentation on the user computing device 140. In some implementations, the animated content item can be an image animation, a video animation, among others. In some implementations, the viewport monitoring library 114 can be configured to cause the user computing device 140 to identify an object of the image animation displayed on an application as the animated content item. In some implementations, the viewport monitoring library 114 can be configured to cause the content management system 110 to identify an object of the image animation displayed on an application as the animated content item. In some implementations, the animated content item can be included in a container, such as an iframe of a DOM tree of the application. The animated content item can be an article included in the container. In some implementations, the animated content item can be any portion of an article, for instance, a header, an image, a title, among others. The container can include one or more animated content items. The container can be configured to change the one or more properties of the one or more animated content items in such a way that the animated content items correspond to a particular position within the viewport of the application.

The viewport monitoring library 114 can monitor a position of the animated content item relative to a reference point of the application such that the values of the one or more properties associated with the animated content item can be interpolated as the animated content item moves through the viewport of the application. In some implementations, the viewport monitoring library 114 can monitor the position of the animated content item relative to a viewport to detect a position-dependent setting in which the animated content item is presented within the viewport of the application.

In some implementations, the viewport monitoring library 114 can be configured to cause the user computing device 140 to determine coordinates of the animated content item relative to a reference point of the application. In some implementations, the viewport monitoring library 114 can be configured to cause the content management system 110 to determine coordinates of the animated content item relative to a reference point of the application. In some implementations, the reference point of the application can include a top corner of the application. In some implementations, the viewport monitoring library 114 can determine that the application is configured to extend vertically or horizontally. In implementations in which the application is configured to extend vertically, the viewport monitoring library 114 can cause the user computing device 140 to determine a coordinate value of an animated content item along the vertical axis, or stated differently, the y-axis coordinate. In implementations in which the application is configured to extend horizontally, the viewport monitoring library 114 can cause the user computing device 140 to determine a coordinate value of an animated content item along the horizontal axis, or stated differently, the x-axis coordinate. The coordinate value can be a number of pixels, a distance, or a scaled distance from the reference point of the application. In some implementations, the coordinate value can be a percentage corresponding to a point of the animated content item, for instance, a top edge of the animated content item.

In some implementations, the point of the animated content item can be any point of the animated content item or corresponding to the animated content item. In some implementations, the viewport monitoring library 114 can be configured to cause the user computing device 140 to identify a predefined point or portion on the animated content item (for instance, a center of the animated content item, one of the edges of the animated content item, one of the corners of the animated content item, among others). In some implementations, the viewport monitoring library 114 can cause the user computing device 140 to identify a coordinate of the animated content item corresponding to an axis along which the application can be scrolled. For instance, if the application is configured to be scrolled vertically, the viewport monitoring library 114 can cause the user computing device 140 to identify one of a top edge or a bottom edge of the animated content item. If the application is configured to be scrolled horizontally, the viewport monitoring library 114 can cause the user computing device 140 to identify one of a left edge or a right edge of the animated content item.

The viewport monitoring library 114 can be configured to cause the user computing device 140 to monitor coordinate values of the application based on the relative position of the application to the viewport. For instance, the viewport monitoring library 114 can cause the user computing device 140 to identify a first portion of the application that aligns with a first edge (for instance, a top edge) of the viewport. As a user scrolls (e.g., receive a scroll event) the application, different portions of the application will align with the first edge of the viewport. In some implementations, the viewport monitoring library 114 can be configured to cause the user computing device 140 to periodically monitor which portion of the application is aligned with the top edge of the viewport and which portion of the application is aligned with the bottom edge of the viewport. In some implementations, the viewport monitoring library 114 can be configured to cause the user computing device 140 to identify a second coordinate value of the first portion of the application that aligns with the top edge of the viewport and a third coordinate value of the second portion of the application that aligns with the bottom edge of the viewport using existing JavaScript functions. For instance, the viewport monitoring library 114 can use the function iframeElement.getBoundClientRect( ).top to identify the second coordinate value corresponding to the second portion of the application that is aligned with the top edge of the viewport at a particular scroll position. The function iframeElement.getBoundClientRect( ).top returns a y-coordinate identifying the first portion of the application that is aligned with the top edge of the viewport. In addition, the viewport monitoring library 114 can use the function iframeElement.getBoundClientRect( ).bottom to identify the third coordinate value corresponding to the second portion of the application that is aligned with the bottom edge of the viewport at the particular scroll position. In some implementations, the third coordinate value can be determined by adding the height of the viewport to the second coordinate value.

In some implementations, the viewport monitoring library 114 can be configured to cause the user computing device 140 to identify a second coordinate value of the first portion of the application that aligns with a first position-dependent setting configured by the content publisher computing device 120 of the viewport and a third coordinate value of the second portion of the application that aligns with a second position-dependent setting configured by the content publisher computing device 120 using the animation configuration interface 112. The one or more position-dependent settings include a position within the viewport at which one or more properties of the animated content item change. For instance, the viewport monitoring library 114 can use the one or more position-dependent settings to identify the second coordinate value corresponding to the second portion of the application that is aligned with the first position-dependent setting within the viewport at a particular scroll position. In addition, the viewport monitoring library 114 can use the one or more position-dependent settings to identify the second coordinate value corresponding to the second portion of the application that is aligned with the second position-dependent setting within the viewport at a particular scroll position.

In some implementations, the viewport monitoring library 114 can be configured to cause the user computing device 140 to identify a fourth coordinate value of a third portion of the application that aligns with a third position-dependent setting configured by the content publisher computing device 120 of the viewport using the animation configuration interface 112.

To determine that the animated content item is visible within the viewport of the application executing on the user computing device 140, the viewport monitoring library 114 can determine whether the first coordinate value is between the second coordinate value and the third coordinate value. The viewport monitoring library 114 can be configured to compare the coordinate value of the animated content item to the coordinate values of the viewport. The viewport monitoring library 114 can determine that the animated content item is visible within the viewport if the coordinate value of the animated content item is determined to be a number between the second and third coordinate values, between the second and fourth values, and/or between the third and fourth values.

In some implementations, the viewport monitoring library 114 can be configured to cause the user computing device 140 to detect if a scroll activity occurred within the application. For instance, the viewport monitoring library 114 can be configured to receive information from the application indicative of a movement (e.g., up or down) of a scroll tab of a scroll bar associated with the viewport or the application. In some implementations, the viewport monitoring library 114 can be configured to monitor a position of the scroll tab relative to the scroll bar or relative to the viewport based on, for instance, scroll information received from the application. In some implementations, the viewport monitoring library 114 can determine if scroll activity occurred by employing one or more listeners that detect scroll activity, including but not limited to "OnScroll," among others. In some implementations, the viewport monitoring library 114 can be configured to monitor a viewport of an application.

The content management system 110 can include at least one database 116. The database 116 can include data structures for storing information such as the animation configuration interface 112, animated or other content items, or additional information. The database 116 can be part of the content management system 110, or a separate component that the content management system 110, the content publisher computing device 120, or the user computing device 140 can access via the network 130. The database 116 can also be distributed throughout system 100. For example, the database 116 can include multiple databases associated with the content publisher computing device 120, the user computing device 140, content management system 110, or all three. In one implementation, the content management system 110 includes the database 116.

Figure 2:
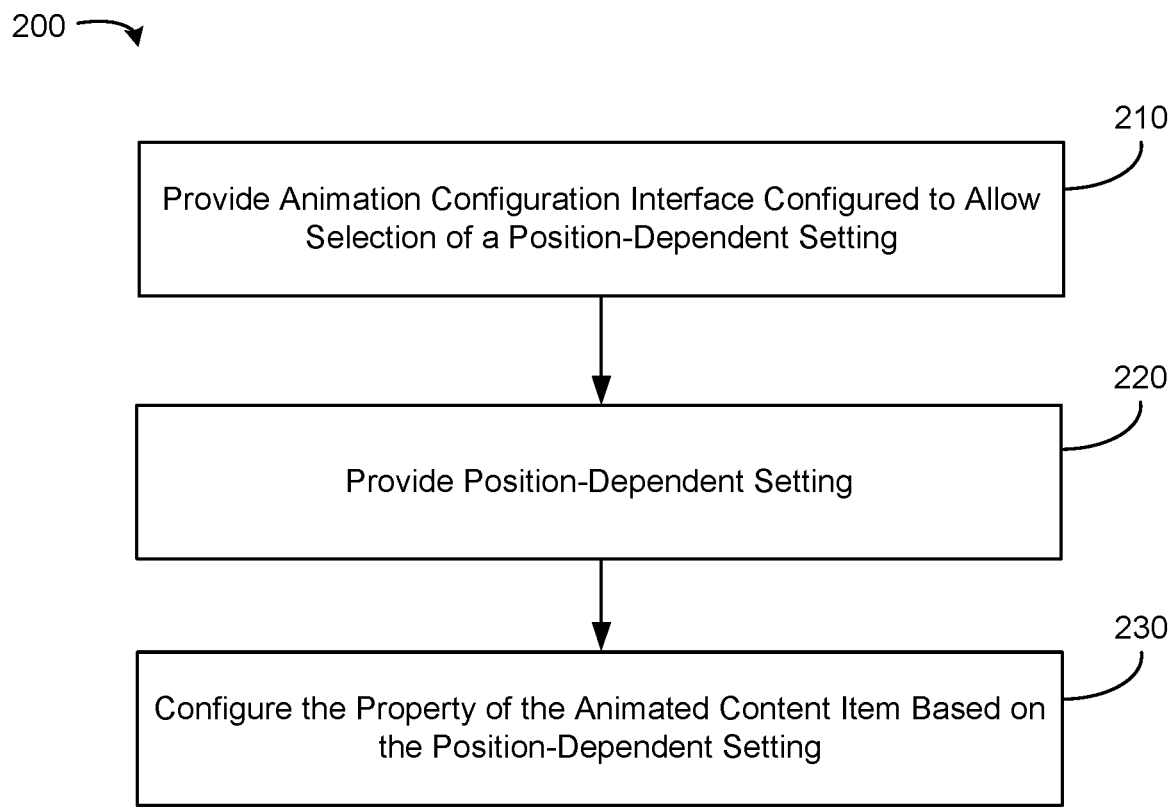
FIG. 2 is a flowchart for a method of configuring an animated content item, according to an illustrative implementation.

Referring now to FIG. 2, a flowchart for a method 200 of configuring an animated content item, according to an illustrative implementation. The content management system 110, the content publisher computing device 120, and/or the user computing device 140 can be configured to perform the method 200. Furthermore, any computing device described herein can be configured to perform the method 200.

In broad overview of the method 200, at stage 210, the animation configuration interface 112 is provided to the content publisher computing device 120 to allow selection via the content publisher computing device 120 of a position-dependent setting. The position-dependent setting including a position with the viewport at which a property of an animated content item changes. At stage 220, a user computing device 140 receives, from the content publisher computing device 120, the position-dependent setting. At stage 230, the user computing device 140 configures the property of the animated content item based on the position-dependent setting such that the animated content item is configured to change the property when presented within a viewport at the position of the viewport in accordance with the position-dependent setting received in stage 220.

Referring to the method 200 in more detail, at stage 210, the animation configuration interface 112 is provided to the content publisher computing device 120. For example, the content publisher computing device 120 can make a request to the content management system 110 for the animation configuration interface 112. In some implementations, in response to the request, the content management system 110 provides the animation configuration interface to the content publisher computing device 120 via the network 130. In some implementations, the animation configuration interface 112 is configured to allow selection via the content publisher computing device 120 of a position-dependent setting comprising a position within the viewport at which a property of the animated content item changes. In some implementations, the animation configuration interface 112 is configured to allow selection via the content publisher computing device 120 of more than one position-dependent settings comprising more than one positions within the viewport at which one or more properties of the animated content item changes. Additional details relating to the implementation of the animation configured interface 112, and configuring the one or more position-dependent settings are provided herein with respect to FIGS. 3, 4, 5, 6, 7, and 8.

At stage 220, the user computing device 140 receives the position-dependent setting. In some implementations, the user computing device 140 may request the position-dependent setting of an animated content item via a user entering a URL into an address portion of a web browser. In some implementations, the content publisher computing device 120, such as the content publisher computing device 120 of FIG. 1A, sends the position-dependent setting to effect the presentation of the animated content items to the user computing device 140 via network 130. In some implementations, the content management system 110, such as the content management system 110 of FIG. 1B, sends the position-dependent setting to effect the presentation of the animated content items to the user computing device 140 via network 130. In some implementations, the user computing device 140 may request more than one position-dependent setting of an animated content item via a user entering a URL into an address portion of a web browser.

In some implementations, the user computing device 140 receives one or more position-dependent settings. Each position-dependent setting may include a position within the viewport at which a property of the animated content item changes. In some implementations, each position-dependent setting may include one or more properties associated with the position within the viewport at which one or more properties of the animated content item change.

At stage 230, the user computing device 140 configures the property of the animated content item based on the position-dependent setting such that the animated content item is configured to change the property when presented within a viewport at the position of the viewport in accordance with the position-dependent setting received in stage 220. In some implementations the user computing device 140 may have to configure one or more position-dependent settings associated with the animated content items. In some implementations the user computing device 140 may have to configure one or more properties associated with the one or more position-dependent settings.

For example, the user computing device 140 may configure a first position within the viewport based on the received position-dependent settings. The user computing device 140 may subsequently configure a second position and a third position such that there are three positions within the viewport that are each configured with a position-dependent setting where the one or more properties of the animated content item change. In another example, the user computing device 140 may configure a fourth position with the viewport based on the received position-dependent settings.

Figure 3:
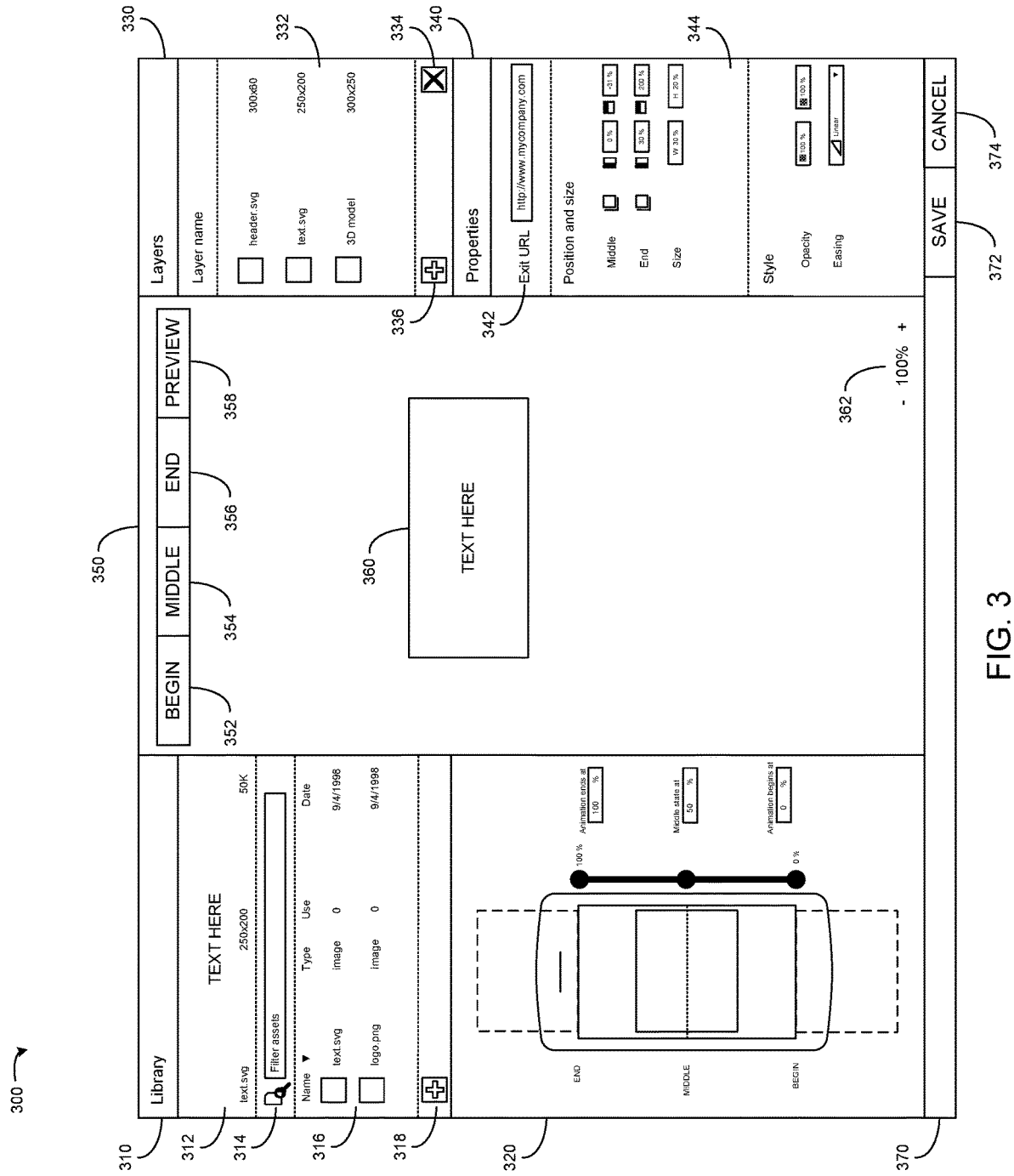
FIG. 3 is an illustration of an example implementation of an animation configuration interface, according to an illustrative implementation.

FIG. 3, described below, illustrates an example implementation of an animation configuration interface 300. Generally, an animation configuration interface 300 can be rendered at the content publisher computing device 120 to configure one or more position-dependent settings associated with one or more animated content items. The animation configuration interface 300 can include a plurality of interfaces and objects. For example, the content management system 110 can execute to provide the animation configuration interface 300 with at least one asset panel 310, at least one animation timing panel 320, at least one layer panel 330, at least one properties panel 340, at least one main panel 350, and at least one footer panel 370. In some implementations, each panel may include a plurality of sub-panels. In some implementations, each panel within the animation configuration interface 300 operates by receiving input from an input device (e.g., a pointing device, a keyboard, a touchscreen, or another form of input device). In response, the content publisher computing device 120 executing the animation configuration interface 300 may request data such as an animated content item 360 from a database (e.g., database 116) corresponding to content management system 110 via the network 130. In some implementations, the content publisher computing device 120 executing the animation configuration interface 300 may request data such as an animated content item 360 from a data storage unit of the content publisher computing device 120.

The animation configuration interface 300 can execute at the content publisher computing device 120, the content management system 110, or both to provide the animation configuration interface 300 at the content publisher computing device 120. In some implementations, the animation configuration interface 300 can be provided within a web browser. In some implementations, the content management system 110 executes to provide the animation configuration interface 300 at the content publisher computing device 120 without utilizing the web browser. In one implementation, an application executed by the content publisher computing device 120 can cause the animation configuration interface 300 to present on a monitor or screen of the content publisher computing device 120.

In some implementations, a content producer (a user or human operator) using the content publisher computing device 120 can input one or more position-dependent settings into the animation timing panel 320 within the animation configuration interface 300. Each position-dependent setting can include a position within the viewport at which one or more properties of the animated content item 360 change. Each position-dependent setting can include one or more properties (e.g., translation, opacity, size). In some implementations, each property can be individually configured using the animation timing panel 320 and/or the properties panel 340 such that each property is independent of any other property, for instance, a first position-dependent setting may be configured to have an opacity of the animated content item 360 be set to 70%, a size of the animated content item 360 be set to width of 30% and height of 20%, and a translation of the animated content item 360 be set to x-axis of 60 pixels and y-axis of 0 pixels. A second position-dependent setting may be configured to have an opacity of the animated content item 360 be set to 50%, a size of the animated content item 360 be set to width of 50% and height of 50%, and a translation of the animated content item 360 be set to x-axis of 120 pixels and y-axis of 60 pixels, such that during a scroll event (e.g., scrolling up or down on a presented article within the viewport of the user computing device 140) the animated content item 360 changes one or more properties depending on the position within the viewport. In some implementations, the animation configuration interface 300 can configure the one or more position dependent settings based on a direction of the scroll event. Additional details relating to the animation timing panel 320 of the animation configuration interface 300 are provided herein with respect to FIGS. 4, 5, 6, 7, and 8.

In some implementations, the animation configuration interface 300 can include the asset panel 310 that can include an asset preview sub-panel 312, an asset filter sub-panel 314, an asset library sub-panel 316, and an add asset button 318. The asset preview sub-panel 312 can present a preview of an object (e.g., image, video, text, audio, scenes another form of object) of the animated content item 360. In some implementations, the asset preview sub-panel 312 presents a preview of the object responsive to receiving a click, a click and a drag, and/or a drop from the asset library sub-panel 316. The asset library sub-panel 316 within the asset panel 310 presents a list of objects. In some implementations, an object can be added to the list of objects, for example, by clicking the add asset button 318, by clicking and dragging, dropping, inserting, or attachment operations to an object, for instance, from a file folder on the content publisher computing device 120. In some implementations, the asset library sub-panel 316 can be filtered using the asset filter sub-panel 314. For example, the content producer (a user or human operator) using the content publisher computing device 120 can input one or more characters into the asset filter sub-panel 314 input field within the animation configuration interface 300 and in response, filter out (i.e., stop presenting) any objects presented in the asset library sub-panel 316 that do not match the inputted characters.

In some implementations, the animation configuration interface 300 can include the layer panel 330 that can include a layer selection sub-panel 332, a delete layer button 334, and an add layer button 336. The layer selection sub-panel 332 presents a list of layers. In some implementations, the layer selection sub-panel 332 can be used to add one or more layers to the animated content item 360. In some implementations, one or more layers can be added to the list of layers, for example, by clicking the add layer button 336, by clicking and dragging, dropping, inserting, or attachment operations to one or more layers. In some implementations, one or more layers can be removed from the list of layers, for example, by clicking the delete layer button 334, by clicking and dragging, dropping, inserting, or removal operations to one or more layers.

In some implementations, the animation configuration interface 300 can include the properties panel 340 that can include a URL sub-panel 342, and a properties configuration sub-panel 344. In some implementations, the URL sub-panel 342 can receive input through the URL sub-panel 342 input field. For example, the content producer (a user or human operator) using the content publisher computing device 120 can input one or more characters into the URL sub-panel 342 input field within the animation configuration interface 300. The inputted characters can be embedded into the animated content item 360 (e.g., URL), for example, when selected within the viewport of the user computing device 140, to cause an application to redirect to a company website.

In some implementations, one or more properties of the animated content item 360 can be configured using the properties configuration sub-panel 344. In some implementations, each property can be individually configured using the properties panel 340 and/or the animation timing panel 320 such that each property is independent of any other property. In some implementations, one or more properties can be based on one or more position-dependent settings. In some implementations, each position-dependent setting can include a position within the viewport at which one or more properties of the animated content item 360 change.

For example, the content producer (a user or human operator) using the content publisher computing device 120 can configure using the properties configuration sub-panel 344 to have a first (i.e., beginning) position-dependent setting rotate the animated content item 360 clockwise as the animated content item 360 moves through the viewport between a first position and a third (i.e., middle) position. The content producer (a user or human operator) using the content publisher computing device 120 can also configure using the properties configuration sub-panel 344 a second (i.e., ending) position-dependent setting rotate the animated content item 360 counter-clockwise as the animated content item 360 moves through the viewport between the third position and a second position.

In another example, the content producer (a user or human operator) using the content publisher computing device 120 can configure using the properties configuration sub-panel 344 to have a first (e.g., beginning) position-dependent setting rotate the animated content item 360 clockwise as the animated content item 360 moves through the viewport from the bottom to top (e.g., a viewport bottom 422 to a viewport top 420) of the viewport between a first position and a third (e.g., middle) position. In contrast, the content publisher computing device 120 can configure using the properties configuration sub-panel 344 to have the first position-dependent setting rotate the animated content item 360 counter-clockwise as the animated content item 360 moves through the viewport from the top to bottom (e.g., the viewport top 420 to the viewport bottom 422) of the viewport between a first position and a third position. Furthermore, the content producer (a user or human operator) using the content publisher computing device 120 can also configure using the properties configuration sub-panel 344 a second (e.g., ending) position-dependent setting rotate the animated content item 360 counter-clockwise as the animated content item 360 moves through the viewport from the bottom to top (e.g., a viewport bottom 422 to a viewport top 420) of the viewport between the third position and a second position. In contrast, the content publisher computing device 120 can configure using the properties configuration sub-panel 344 to have the second position-dependent setting rotate the animated content item 360 clockwise as the animated content item 360 moves through the viewport from the top to bottom (e.g., the viewport top 420 to the viewport bottom 422) of the viewport between a third position and a second position.

In some implementations, the animation configuration interface 300 can include the main panel 350 that can include a begin button 352, a middle button 354, an end button 356, a preview button 358, an animated content item 360, and a zoom widget 362. Each button along the top of the panel (begin button 352, middle button 354, end button 356, preview button 358), when selected, modifies the presentation of the animated content item 360. The zoom widget 362, when selected, can cause the animation configuration interface to generate a magnified presentation of the animated content item 360 or an unmagnified presentation of the animated content item 360 within the main panel 350.

In some implementations, the begin button 352, when selected, can cause the animation configuration interface 300 to generate a presentation of the first (e.g., beginning) position-dependent settings associated with the animated content item 360, where objects can be added or removed using the asset panel 310, where layers can be added or removed using the layer panel 330, and where properties (e.g., translation, opacity, size) can be added or removed using the properties panel 340. The presentation may be put in motion in an animated sequence presenting one or more properties (e.g., translation, opacity, size) associated with the first position-dependent settings.

In some implementations, the middle button 354, when selected, can cause the animation configuration interface 300 to generate a presentation of the third (e.g., middle) position-dependent settings associated with the animated content item 360, where objects can be added or removed using the asset panel 310, where layers can be added or removed using the layer panel 330, and where properties (e.g., translation, opacity, size) can be added or removed using the properties panel 340. The presentation may be put in motion in an animated sequence presenting one or more properties (e.g., translation, opacity, size) associated with the third position-dependent settings.

In some implementations, the end button 356, when selected, can cause the animation configuration interface 300 to generate a presentation of the second (e.g., ending) position-dependent settings associated with the animated content item 360, where objects can be added or removed using the asset panel 310, where layers can be added or removed using the layer panel 330, and where properties (e.g., translation, opacity, size) can be added or removed using the properties panel 340. The presentation may be put in motion in an animated sequence presenting one or more properties (e.g., translation, opacity, size) associated with the second position-dependent settings.

In some implementations, the preview button 358, when selected, can cause the animation configuration interface 300 to generate a preview of the animated content item 360, where objects are put in motion in an animated sequence between positions (e.g., first position and third position, third position and second position) presenting one or more properties (e.g., translation, opacity, size) of the position-dependent settings. In some implementations, the positions at which the animated content item presents can be referred to as an animated content item slot (e.g., animated content slot 426).

In some implementations, the animation configuration interface 300 can include the footer panel 370 that can include a save button 372, and a cancel button 374. The save button 372, when selected, can cause the animation configuration interface 300 to save the configuration of the animated content item 360 in the database 116 or in a data storage unit of the content publisher computing device 120. The cancel button 374, when selected, can cause the animation configuration interface 300 to delete all configurations of the animated content item 360 that had not been previously saved. In some implementations, the animation configuration interface 300 may include other functionalities such as panels for configuring full screen mode. Full screen mode can be configured such that the animated content item 360 presents on the entire viewport. The full screen mode can include an exit options and additional overlay functions such as triggering animations of the animated content item in full screen, camera zoom (for introduction), enabling the user of the user computing device 140 to change the color of an object, or zoom in and view features of the animated content item in greater detail.

In some implementations, the animation configuration interface 300 may include other functionalities such as panels for configuring payment settings. Payment settings can include option for financial transactions such as a donation, a product purchase, or any other type of financial transaction. In some implementations, the animation configuration interface 300 may include other functionalities such as panels for maps and/or geolocation functionality. In some implementations, the animation configuration interface 300 may include other functionalities such as panels for add-ins. For example, a phone number add-in that enables a user interacting with the animated content item 360 to select the animated content item 360 to execute a phone call. In some implementations, the animation configuration interface 300 may include other functionalities such as panels for video editing. In some implementations, the animation configuration interface 300 may include other functionalities such as panels for position timing settings. Position timing settings can include delaying the start of an animated content item based on time.

Figure 4:
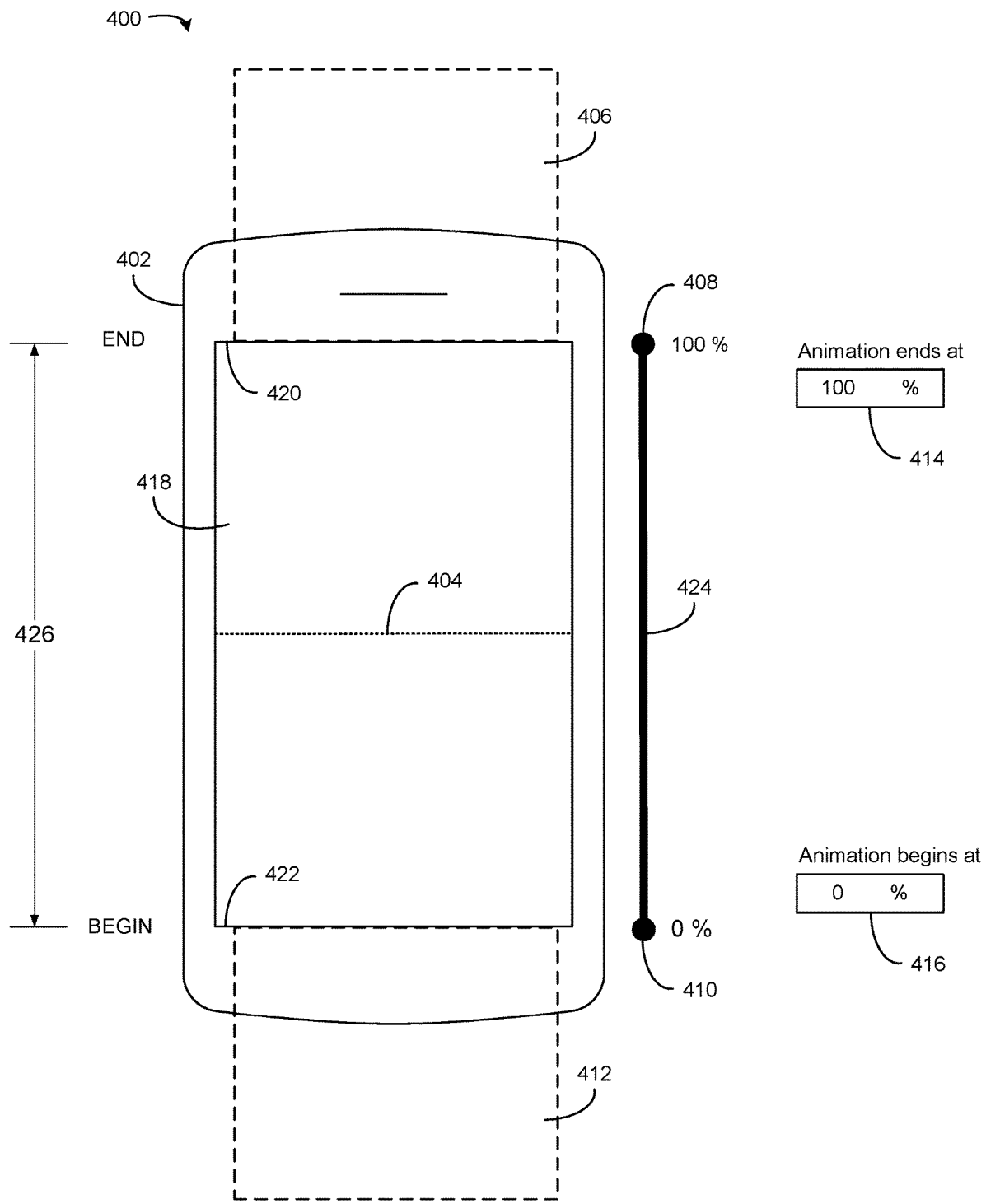
FIG. 4 is an illustration of an example implementation of an animation timing panel within the animation configuration interface, according to an illustrative implementation.

FIG. 4, described below, illustrates an example implementation of an animation timing panel 400 within the animation configuration interface 300. The animation timing panel 400 depicts a user computing device template 402, such as a smartphone or tablet, on which an animated content item 360 may be presented by a viewport 418 of a computing device (e.g., user computing device 140). In some implementations, viewport 418 is defined by an orientation, the orientation including a viewport top 420 (e.g., 100%), a viewport bottom 422 (e.g., 0%) and a middle guideline (e.g., 50%). In some implementations, the animated content item 360 is presented within an animated content item slot 426. The animation timing panel 400 can include one or more configurable settings. In the some implementations, the animation timing panel 400 can include a graphical frame 406, a slider interface 424, a slider set point 408, a slider set point 410, a graphical frame 412, an input field 414, and an input field 416. In some implementations, each frame, slider, field combination (e.g., graphical frame 406, slider set point 408, input field 414, or graphical frame 412, slider set point 410, input field 416) can perform similar functions and can be configured interchangeably such that whenever the input field is changed, the slider, and graphical frame also change according to the input field.

Generally, each graphical frame can be a graphical representation of a position of the animated content item 360 within the viewport 418 that is movable to set a new position within the viewport 418 at which one or more properties of the animated content item 360 change. For example, by clicking anywhere within the graphical frame borders and dragging the graphical frame to a different position within the viewport 418. Each slider set point can be a slider set point representation of a position of the animated content item 360 within the viewport 418 that is movable to set a new position on the slider interface 424 at which one or more properties of the animated content item 360 change. For example, by clicking one of the slider set points and dragging the slider set point to a different position on the slider interface 424. Each input field can be a numerical representation of a position of the animated content item 360 within the viewport 418 that can receive input to set a new position at which one or more properties of the animated content item 360 change. For example, by inputting a different number into the input field.

In some implementations, each graphical frame can be selected and moved using an input device (e.g., a pointing device, a keyboard, a touch screen, or another form of input device), for instance, of the content publisher computing device 120. In some implementations, the graphical frame 412 can be a graphical representation of a first position of the animated content item 360 within the viewport 418 that is movable to select the first position at which one or more animations of the animated content item 360 begins presenting. In some implementations, the graphical frame 406 can be a graphical representation of a second position of the animated content item 360 within the viewport 418 that is movable to select the second position at which one or more animations of the animated content item 360 ends presenting.

For example, the content producer (a user or human operator) using the content publisher computing device 120 can configure the graphical frame 412 to have an animated content item 360 begin presenting when a scroll event is received by a computing device (e.g., user computing device 140) and after the animated content item 360 reaches the first position within the viewport 418. As shown, the graphical frame 412 is configured to begin presenting the animated content item 360 after the animated content item 360 reaches the viewport bottom 422.

In some implementations, each slider set point can be selected and moved along the slider interface 424 using an input device (e.g., a pointing device, a keyboard, a touch screen, or another form of input device), for instance, of the content publisher computing device 120. In some implementations, the slider set point 408 can be a slider set point representation of a first position of the animated content item 360 within the viewport 418 that is movable along the slider interface 424 to select the first position at which one or more animations of the animated content item 360 begins presenting. In some implementations, the slider set point 410 can be a slider set point representation of a second position of the animated content item 360 within the viewport 418 that is movable along the slider interface 424 to select the second position at which one or more animations of the animated content item 360 ends presenting.

For example, the content producer (a user or human operator) using the content publisher computing device 120 can configure the slider set point 410 to have an animated content item 360 begin presenting when a scroll event is received by a computing device (e.g., user computing device 140) and after the animated content item 360 reaches the first position within the viewport 418. As shown, the slider set point 410 is configured to begin presenting the animated content item 360 after the animated content item 360 reaches the viewport bottom 422.

In some implementations, each input field can receive input using an input device (e.g., a pointing device, a keyboard, a touch screen, or another form of input device), for instance, of the content publisher computing device 120. In some implementations, the input field 416 can be a numerical representation of a first position of the animated content item 360 within the viewport 418 that can receive input to set the first position at which one or more animations of the animated content item 360 begins presenting. In some implementations, the input field 414 can be a numerical representation of a second position of the animated content item 360 within the viewport 418 that can receive input to set the second position at which one or more animations of the animated content item 360 ends presenting.

For example, the content producer (a user or human operator) using the content publisher computing device 120 can input a numerical character into the input field 416 to have an animated content item 360 begin presenting when a scroll event is received by a computing device (e.g., user computing device 140) and after the animated content item 360 reaches the first position within the viewport 418. As shown, the input field 416 is configured to begin presenting the animated content item 360 after the animated content item 360 reaches the viewport bottom 422.

In some implementations, the one or more position-dependent properties are configured on the user device (e.g., user computing device 140). In some implementations, the animated content item 360 can begin presenting at any position within the viewport 418 and end presenting at any position with the viewport 418 (e.g., determined by an animated content item slot 426). For instance, the position-dependent properties can cause the user device to set one or more positions, among position-dependent properties, that is between the viewport top 420 and viewport bottom 422 (e.g., animated content item slot 426). For instance, the position-dependent properties can be 5%, 10%, 15%, 80%, 85%, 90%, or any other percentage value between the viewport top 420 and viewport bottom 422. Considering the example in FIG. 5, for instance the position-dependent properties are arranged between the 15% and 85% positions within the viewport 518. Therefore, the animated content item slot is between 15% and 85%, and therefore indicates that the animated content item 360 will only present between the animated content item slot 526. Accordingly, the position-dependent properties configured by the content producer (a user or human operator) using the content publisher computing device 120 can also configure any combination of positions within the viewport 418 to establish an animated content item slot 426 such that the animated content item 360 presents in between those positions.

Figure 7:
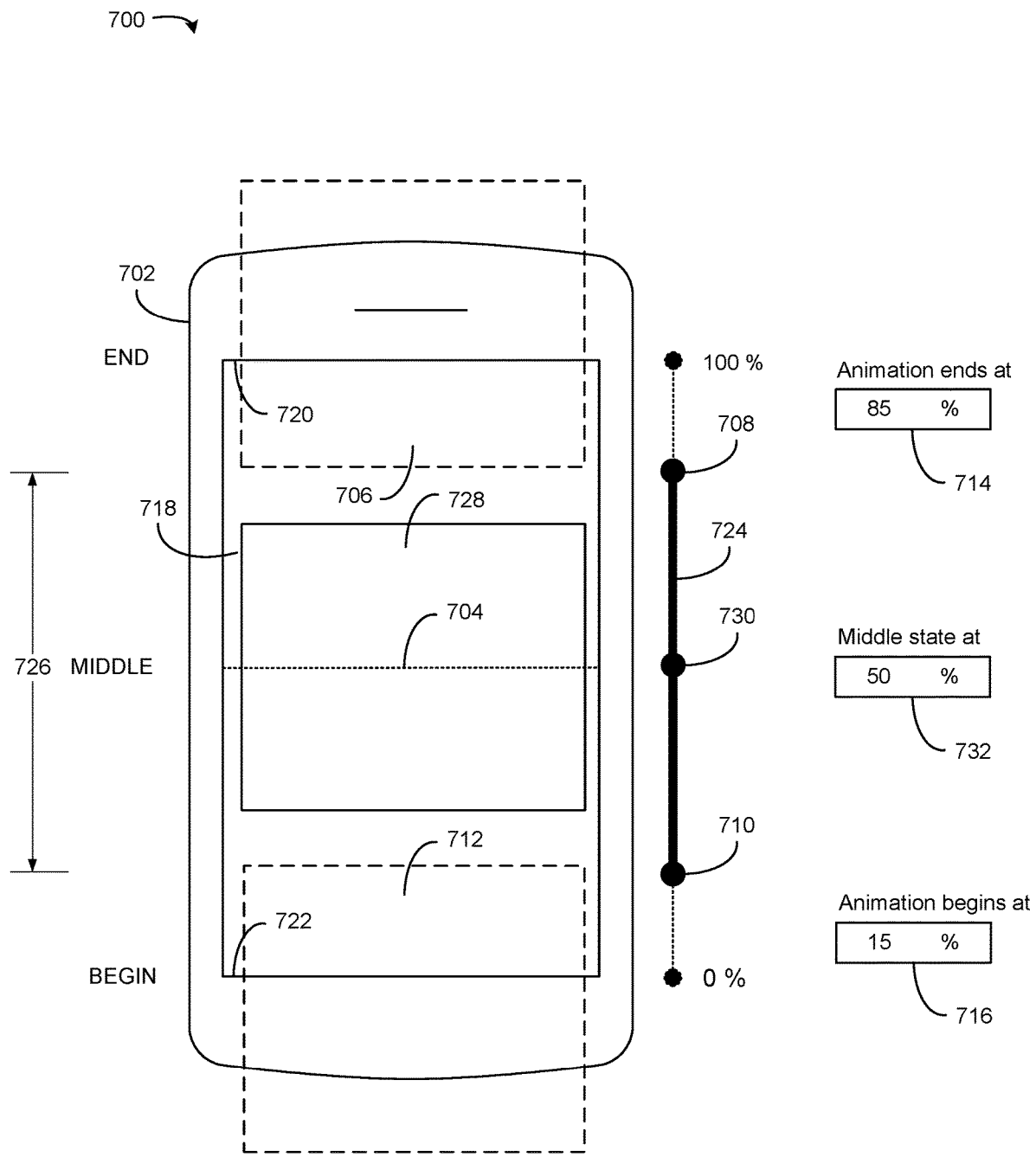
FIG. 7 is an illustration of an example implementation of an animation timing panel within the animation configuration interface, according to an illustrative implementation.

In some implementations, considering the example in FIG. 7, for instance the position-dependent properties are arranged between 15% and 85% while also including a position-dependent property at the 50% position. In some implementations, it is advantageous for the content producer to add a plurality of position-dependent properties to an animated content item 360 since it provides added flexibility and functionality to the animated content item 360. For example, a plurality of text of an animated content item 360 can slide in a specified direction (e.g., horizontally or vertically) as a scroll event within a viewport 718 is between the 15%-50% position-dependent settings. Alternatively, the plurality of text of the animated content item 360 can slide in a different specified direction as the scroll event within the viewport 718 is between 50%-85%. In some implementations, the viewport monitoring library 114 can be provided to the user device (e.g. user computing device 140) such that the values of the one or more properties of the animated content item 360 can be interpolated when the animated content item 360 is between the 15%-50% or 50%-85%.

Figure 5:
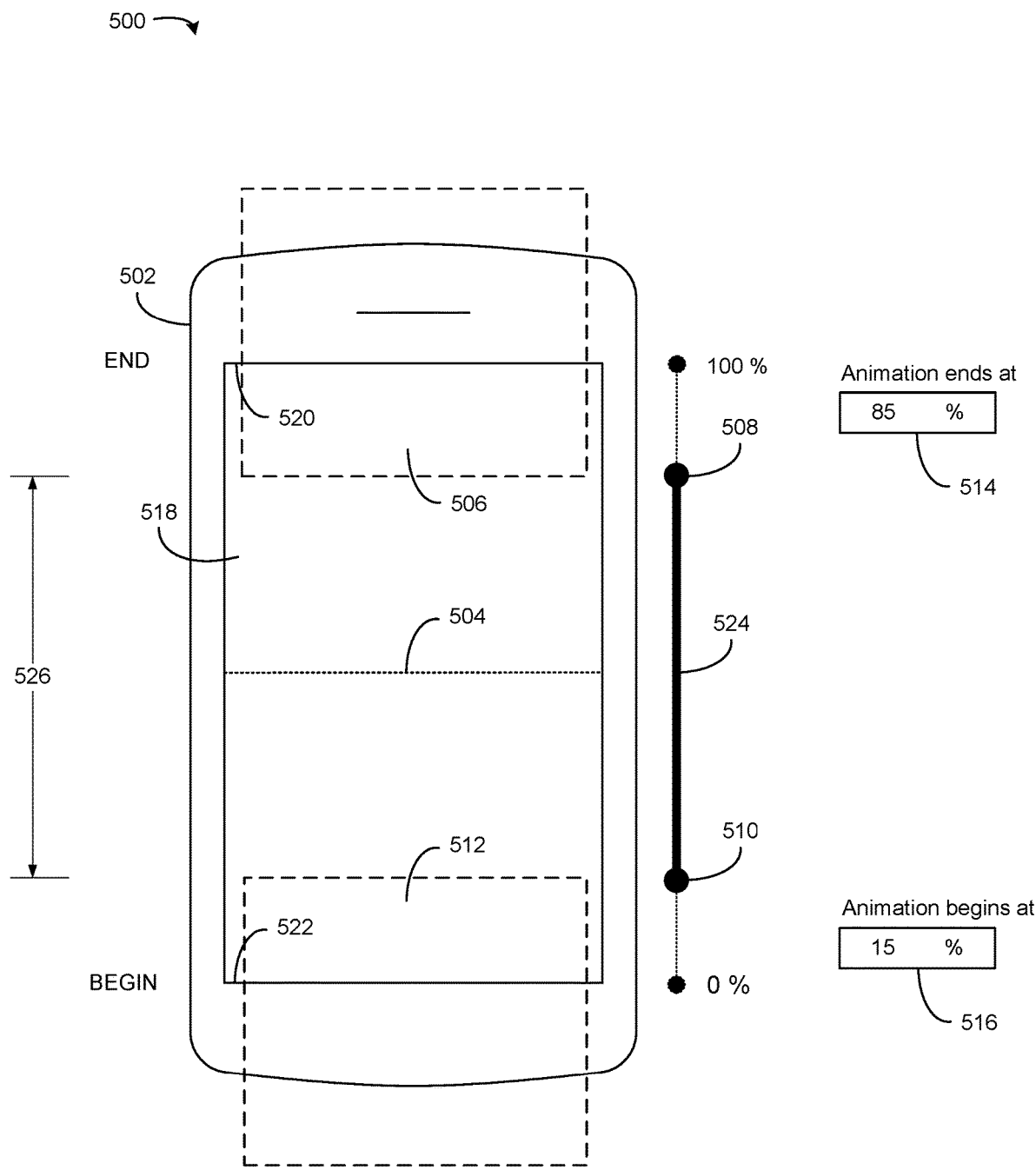
FIG. 5 is an illustration of an example implementation of an animation timing panel within the animation configuration interface, according to an illustrative implementation.

FIG. 5, described below, illustrates an example implementation of an animation timing panel 500 within the animation configuration interface 300. The animation timing panel 500 resembles similar features and functionality, described in detail with reference to FIG. 4. As shown, using either a graphical frame 512, a slider set point 510, or an input field 516, a first position is set to 15%, such that an animated content item 360 begin presenting (e.g., within an animated content item slot 526) when a scroll event is received by a computing device (e.g., user computing device 140) and after the animated content item 360 reaches the first position (e.g., 15%) within the viewport 418. Also as shown, using either a graphical frame 506, a slider set point 510, or an input field 514, a second position is set to 85%, such that an animated content item 360 ends presenting (e.g., not within the animated content item slot 526) when a scroll event is received by a computing device (e.g., user computing device 140) and after the animated content item 360 reaches the second position (e.g., 85%) within the viewport 418.

Figure 6:
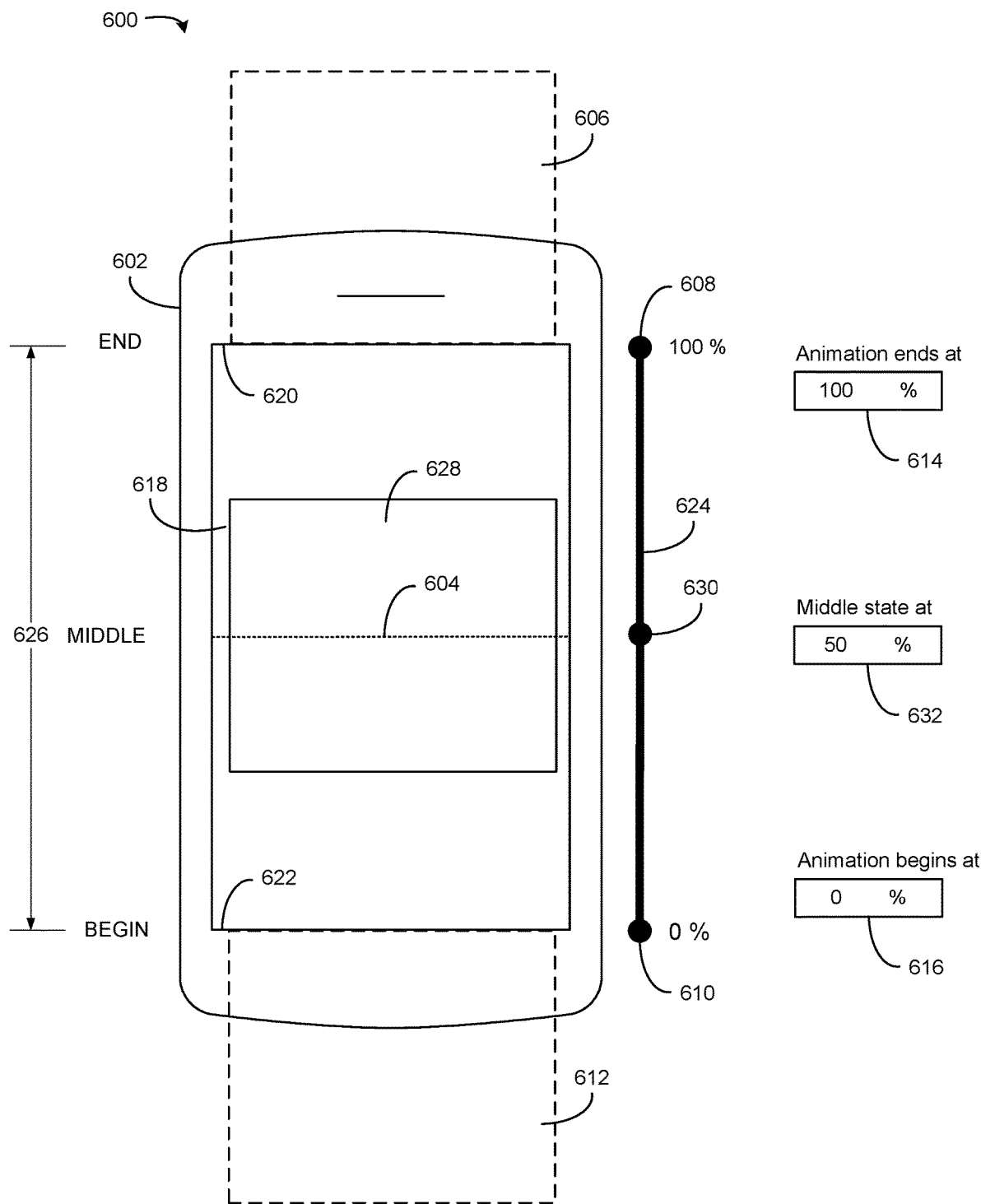
FIG. 6 is an illustration of an example implementation of an animation timing panel within the animation configuration interface, according to an illustrative implementation.

FIG. 6, described below, illustrates an example implementation of an animation timing panel 600 within the animation configuration interface 300. The animation timing panel 600 resembles similar features and functionality, described in detail with reference to FIG. 4. However, in some implementations, the animation configuration interface 300 may include a graphical frame 628, a slider set point 630, and input field 632. For example, instead of having two positions within the viewport 418 at which one or more properties of the animated content item 360 change, the amination timing panel can enable a content producer (a user or human operator) using the content publisher computing device 120 to configure a third position within an animated content item slot 626, using the graphical frame 628, slider set point 630, or input field 632. In some implementations, the amination timing panel can enable a content producer (a user or human operator) using the content publisher computing device 120 to configure a fourth position within an animated content item slot 626, using a different graphical frame, a different slider set point, or a different input field. In the example shown in FIG. 6, the slider set point 630 for the third position is set at a middle point 604 of the viewport 618 such that the graphical frame 628 corresponds with a middle portion of the viewport 618.

FIG. 7, described below, illustrates an example implementation of an animation timing panel 700 within the animation configuration interface 300. The animation timing panel 700 resembles similar features and functionality, described in detail with reference to FIG. 4 and FIG. 6. As shown, using either a graphical frame 712, a slider set point 710, or an input field 716, a first position is set to 15%, such that an animated content item 360 begin presenting (i.e., within an animated content item slot 726) when a scroll event is received by a computing device (e.g., user computing device 140) and after the animated content item 360 reaches the first position (e.g., 15%) within the viewport 718. Also as shown, using either a graphical frame 706, a slider set point 708, or an input field 714, a second position is set to 85%, such that an animated content item 360 ends presenting (e.g., not within the animated content item slot 726) when a scroll event is received by a computing device (e.g., user computing device 140) and after the animated content item 360 reaches the second position (e.g., 85%) within the viewport 718. Furthermore as shown, using either a graphical frame 728, a slider set point 730, or an input field 732, a third position is set to 50%, such that one or more properties of the animated content item 360 may change after the animated content item 360 reaches the third position (e.g., 50%) within the viewport 718.

Figure 8:
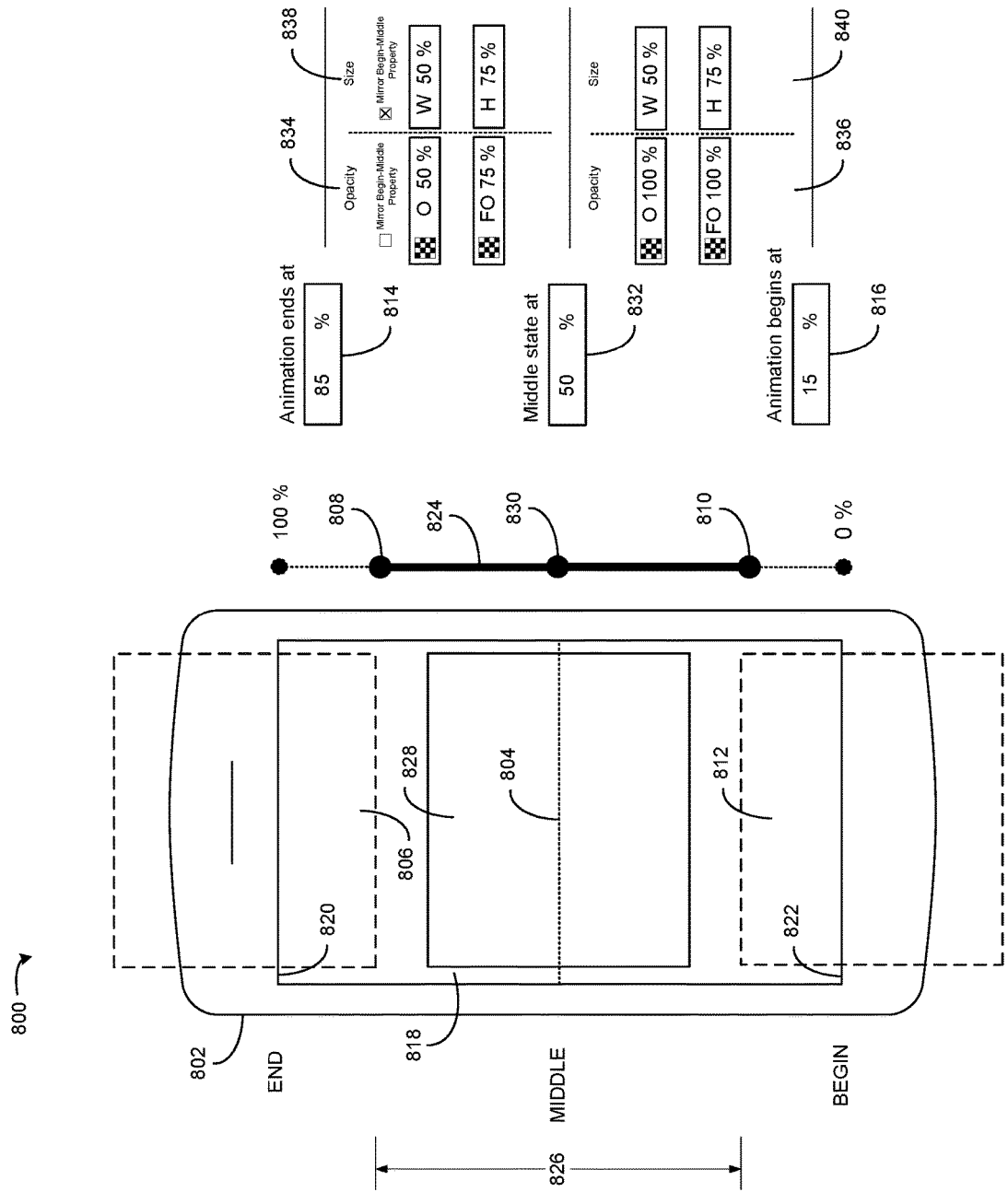
FIG. 8 is an illustration of an example implementation of an animation timing panel within the animation configuration interface, according to an illustrative implementation.

FIG. 8, described below, illustrates an example configuration of an animation timing panel 800 within the animation configuration interface 300. The animation timing panel 800 resembles similar features and functionality, described in detail with reference to FIG. 4 and FIG. 6. Additionally, the animation timing panel 800 can include functionality for configuring the one or more properties of the animated content item 360 based on a position within the viewport. In some implementations, the animation timing panel 800 can include a first-third position property 836, a first-third position property 840, a second-third position property 834, and a second-third position property 838. Each first-third position property is configured such that when the animated content item 360 is presented within an animated content item slot 826 between a first position (e.g., slider set point 810) and a third position (e.g., slider set point 830) the animated content item 360 is presented in accordance with the configured properties. For example, as shown, the animated content item 360 will present between the first position and third position with an opacity property of opacity of 100% and fill opacity of 100%, and a size property of width of 50% and height of 75%. The opacity controlling the opacity of the entire animated content item 360 and the fill opacity controlling only the opacity for a fill color (e.g., background color of the animated content item 360). In contrast, each third-second position property is configured such that when the animated content item 360 is presented within the animated content item slot 826 between a third position (e.g., slider set point 830) and a second position (e.g., slider set point 808) the animated content item 360 is presented in accordance with the configured properties. For example, as shown, the animated content item 360 will present between the third position and second position with an opacity property of opacity of 50% and fill opacity of 75%, and a size property mirroring (e.g., exactly the same) the size property of the first-third position property.

Figure 9:
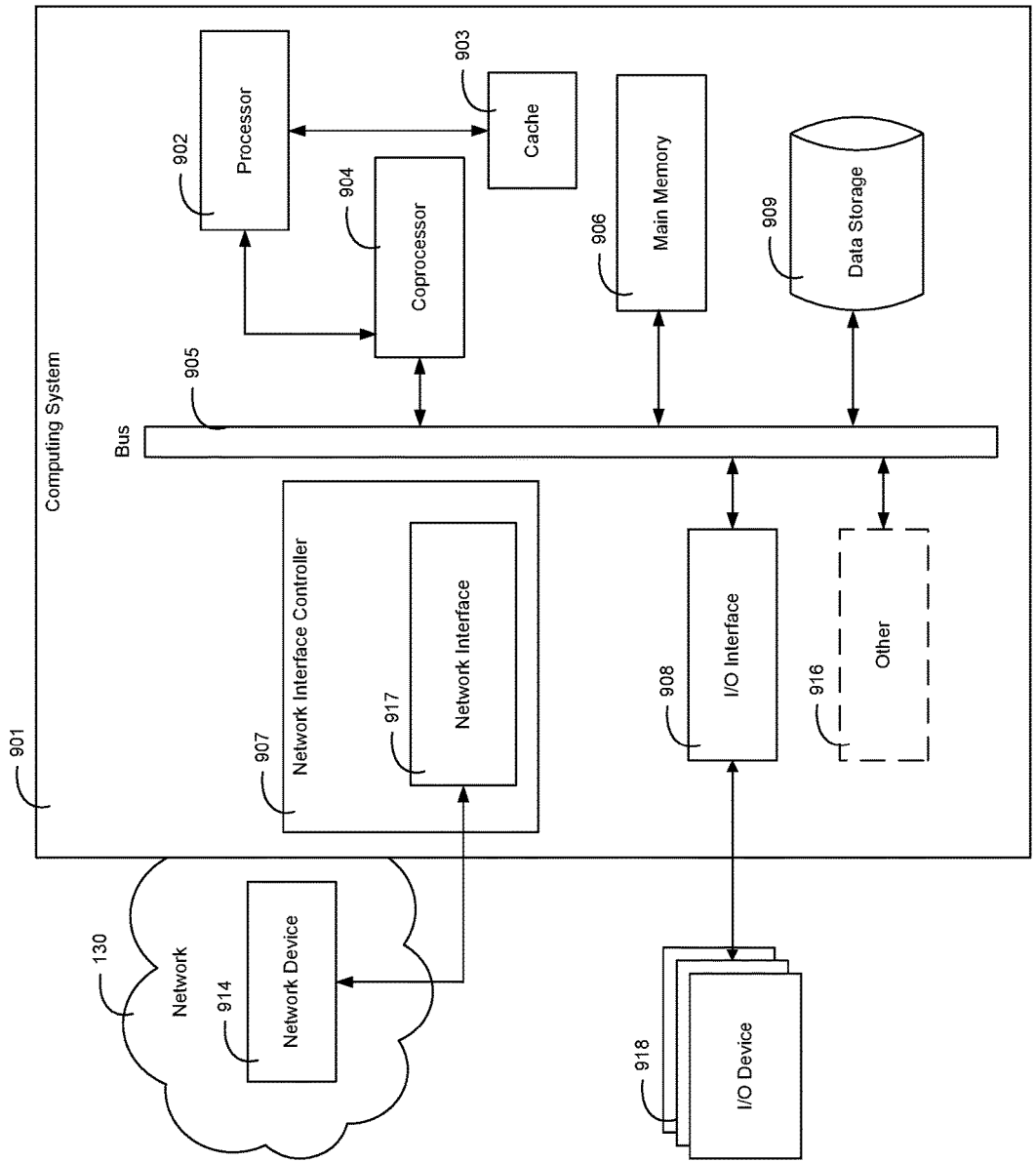
FIG. 9 is a block diagram illustrating an example computing device suitable for use in the various implementations described herein, according to an illustrative implementation.

Referring now to FIG. 9, a block diagram of an example computing system 901 is shown, according to an illustrative implementation. The computing system 901 is suitable for use in implementing the computerized components described herein, in accordance with an illustrative implementation. In broad overview, the computing system 901 includes a processor 902 for performing actions in accordance with instructions, e.g., instructions held in cache memory 903. The illustrated example computing system 901 includes one or more processors 902 and coprocessors 904 in communication, via a bus 908, with main memory 906, a network interface controller 907, an input/output (I/O) interface 908, and a data storage 909. In some implementations, the computing system 901 may include additional interfaces or other components 916.

In some implementations, a processor 902 can be configured to load instructions from the main memory 906 (or from data storage 909) into cache memory 903. Furthermore, the processor 902 can be configured to load instructions from cache memory 903 into onboard registers and execute instructions from the onboard registers. In some implementations, instructions are encoded in and read from a read-only memory (ROM) or from a firmware memory chip (e.g., storing instructions for a Basic I/O System (BIOS)), not shown.

As shown, the processor 902 is directly connected to the cache memory 903. However, in some implementations, the cache memory 903 is integrated into the processor 902 and/or implemented on the same circuit or chip as the processor 902. Some implementations include multiple layers or levels of cache memory 903, each further removed from the processor 902. Some implementations include multiple processors 902 and/or coprocessors 904 that augment the processor 902 with support for additional specialized instructions (e.g., a math coprocessor, a floating point coprocessor, and/or a graphics coprocessor). As shown, the coprocessor 904 is closely connected to the processor 902. However, in some implementations, the coprocessor 904 is integrated into the processor 902 or implemented on the same circuit or chip as the processor 902. In some implementations, the coprocessor 904 is further removed from the processor 902, e.g., connected to the bus 908.

The network interface controller 907 can be configured to control one or more network interfaces 917 for connection to network devices 914 (e.g., for access to a network 130). The I/O interface 908 can be configured to facilitate sending and receiving data to various I/O devices 918 such as, but not limited to, keyboards, touch screens, microphones, motion sensors, video displays, speakers, haptic feedback devices, printers, and so forth. In some implementations, one or more of the I/O devices 918 are integrated into the computing system 901. In some implementations, one or more of the I/O devices 918 are external to, and separable from, the computing system 901. In some implementations, the computing system 901 is implemented using special purpose logic circuitry, e.g., an application-specific integrated circuit (ASIC) or a system on a chip (SoC) semiconductor device that includes the processor 902 and one or more additional components, e.g., the cache memory 903, network interface controller 907 and network interface 917, and one or more I/O interfaces 908.

The processors 902 can be any logic circuitry that processes instructions, e.g., instructions fetched from the cache memory 903, main memory 906, data storage 909, or other memory not shown. The processor 902 includes a number of data and instruction registers. In some implementations, on start-up (boot), the processor 902 can be configured to load initial instructions from a BIOS into the registers, including instructions for loading more instructions, and executes instructions from the registers. In some implementations, the BIOS instructions cause the processor 902 to load an operating system (OS), which in turn causes the processor 902 to load and execute one or more programs.

The processors 902 may be augmented by one or more ancillary coprocessors 904, which are auxiliary processing units with specialized instruction sets for specific purposes. In some implementations, the processor 902 faced with an unrecognized instruction will pass the instruction to the coprocessor 904, e.g., via a special bus, and only generate an unrecognized instruction fault if the coprocessor 904 also does not recognize the instruction. The processors 902 and coprocessors 904 may each be single core or multi-core processor(s).

The computing system 901 may include multiple distinct processors 902 and/or multiple distinct coprocessors 904. For example, in some implementations, a general purpose processor 902 such as a multi-core central processing unit (CPU) may be augmented with one or more special purpose coprocessors 904, such as a math coprocessor, floating point coprocessor, or a graphics processing unit (GPU). For example, a math coprocessor 904 can assist the processor 902 with high precision or complex calculations. In some implementations, the processor(s) 902 and coprocessors 904 are implemented as circuitry on one or more chips. The computing system 901 may be based on any processor 902, or set of processors 902 and/or coprocessors 904, capable of operating as described herein.

The cache memory 903 is generally a form of computer memory placed in close proximity to a processor 902 for fast access times. In some implementations, the cache memory 903 is memory circuitry that is part of, or on the same chip as, a processor 902. In some implementations, there are multiple levels of cache memory 903, e.g., L2 and L3 cache layers. In some implementations, multiple processors 902, and/or multiple cores of a processor 902, share access to the same cache memory 903.

The main memory 906 may be any device suitable for storing computer readable data. The main memory 906 is a device that supports direct access to specified addresses, e.g., the main memory 906 is random access memory (RAM). In some implementations, the main memory 906 is a volatile semiconductor memory device such as dynamic random-access memory (DRAM), synchronous dynamic random-access memory (SDRAM), double data rate SDRAM (DDR SDRAM), static random-access memory (SRAM), T-RAM, Z-RAM, and so forth. The computing system 901 may have any number of devices serving as main memory 906.

The data storage 909 may be any device suitable for storing computer readable data between power cycles. In some implementations, the data storage 909 is a device with fixed storage media, such as magnetic disks, e.g., a hard disk drive (HDD). In some implementations, the data storage 909 is a device with removable storage media, such as magnetic disks (e.g., a floppy disk drive or removable HDD), magnetic tape, magneto-optical disks, or optical discs (e.g., CD ROM, DVD-ROM, or BLU-RAY discs). In some implementations, the data storage 909 is a non-volatile semiconductor memory device such as an erasable programmable read-only memory (EPROM), electrically erasable programmable read-only memory (EPROM), or Flash memory. In some implementations, the main memory 906 is a solid-state drive (SSD), e.g., using multi-level cell (MLC) NAND-based Flash memory. A computing system 901 may have any number of devices serving as data storage 909.

Still referring to FIG. 9, the bus 908 is an interface that provides for data exchange between the various internal components of the computing system 901, e.g., connecting the processor 902 to the main memory 906, the network interface controller 907, the I/O interface 908, and data storage 909. In some implementations, the bus 908 further provides for data exchange with one or more components external to the computing system 901, e.g., other components 916. In some implementations, the bus 908 includes serial and/or parallel communication links. In some implementations, the bus 908 implements a data bus standard such as integrated drive electronics (IDE), peripheral component interconnect express (PCI), small computer system interface (SCSI), or universal serial bus (USB). In some implementations, the computing system 901 has multiple busses 908.

The computing system 901 may include, or provide interfaces 908 for, one or more input or output (I/O) devices 918. The I/O devices 918 include input devices such as, without limitation, keyboards, touch screens, touchpads (e.g., electromagnetic induction pads, electrostatic pads, capacitive pads, etc.), microphones, joysticks, foot pedals, Inertial Measurement Units (IMUs), accelerometers, gyroscopes, tilt-sensors, motion sensors, environmental sensors, Musical Instrument Digital Interface (MIDI) input devices such as MIDI instruments (e.g., MIDI keyboards), styluses, and pointing devices such as a mouse or trackball. Output devices include, without limitation, video displays, speakers, haptic feedback devices, refreshable Braille terminals, lights, servos, MIDI output devices such as MIDI synthesizers, and two or three dimensional printers (including, but not limited to, inkjet printers, laser printers, thermographic printers, stereolithographic printers, extrusion deposition printers, and metal sintering printers).

The network 130 enables communication between various nodes such as the computing system 901 and a network device 914. In some implementations, data flows through the network 130 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 130 layered over an OSI layer-3 network protocol such as Internet Protocol (IP), e.g., IPv4 or IPv6. The network 130 is composed of various network devices (nodes) linked together to form one or more data communication paths between participating devices. Each networked device includes at least one network interface for receiving and/or transmitting data, typically as one or more data packets. An illustrative network 130 is the Internet; however, other networks may be used. The network 130 may be an autonomous system (AS), i.e., a network that is operated under a consistent unified routing policy (or at least appears to from outside the AS network) and is generally managed by a single administrative entity (e.g., a system operator, administrator, or administrative group).

The network 130 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 130 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 130 may be any combination of physical links (e.g., fiber optic, mesh, coaxial, twisted-pair such as Cat-5 or Cat-6, etc.) and/or wireless links (e.g., radio, satellite, microwave, etc.).

The network 130 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation 3G, 4G, and 5G protocols. The network 130 can include short-range wireless links, e.g., via Wi-Fi, BLUETOOTH, BLE, or ZIGBEE, sometimes referred to as a personal area network (PAN) or mesh network. The network may be public, private, or a combination of public and private networks. The network 130 may be any type and/or form of data network and/or communication network.

The network interface controller 907 manages data exchanges with devices in the network 130 (e.g., the network device 914) via the network interface 917 (sometimes referred to as a network interface port). The network interface controller 907 handles the physical and data link layers of the Open Systems Interconnection (OSI) model for network communication. In some implementations, some of the network interface controller's tasks are handled by the processors 902 and/or coprocessors 904. In some implementations, the network interface controller 907 is incorporated into the processor 902, e.g., as circuitry on the same chip. In some implementations, a computing system 901 has multiple network interfaces 917 controlled by a single controller 907. In some implementations, a computing system 901 has multiple network interface controllers 907. In some implementations, each network interface 917 is a connection point for a physical network link (e.g., a Cat-5 Ethernet link).

In some implementations, the network interface controller 907 supports wireless network connections and an interface 917 is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In some implementations, the network interface controller 907 implements one or more network protocols such as Ethernet. Generally, the computing system 901 can be configured to exchange data with other computing devices via physical or wireless links through a network interface 917. The network interface 917 may link directly to another device or to another device via an intermediary device, e.g., a network device 914 such as a hub, a bridge, a switch, or a router, connecting the computing system 901 to the network 130.

The network device 914 may be a hub, switch, router, modem, network bridge, another computing system 901, or any other network node. In some implementations, the network device 914 is a network gateway. In some implementations, the network device 914 is a routing device implemented using customized hardware such as a special purpose processor and/or a ternary content-addressable memory (TCAM).

The other components 916 may include an alternative I/O interface, external serial device ports, and any additional coprocessors 904 that are connected via the bus 908. For example, a computing system 901 may include an interface (e.g., a universal serial bus (USB) interface) for connecting external input devices, output devices, or additional memory devices (e.g., portable flash drive or external media drive).

The illustrated computing system 901 is suitable for implementing systems that manage or organize data. For example, in some implementations, the computing system 901 hosts a database. A database, or more specifically a database management system (DBMS), organizes data in accordance with a database definition, e.g., a database schema. For example, in a relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In some implementations, a column represents structured data grouping multiple data elements into a single column. In a relational database, each entry in a column in a table is also in a row associating the entry with entries from other columns in the table.

In some instances, an entry (or combination of entries) will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, eXtensible Markup Language (XML) databases, NoSQL databases, and so forth. Many of these database types use tables, or table-like structures, in a manner similar to that described above in reference to relational databases. In some database implementations, data is stored or represented in a manner other than a table, e.g., as a collection of data tuples.

A client or user of a database can add data to, modify data in, or retrieve data from the database using database instructions, e.g., queries in a database query language such as the Structured Query Language (SQL). One or more database instructions may be grouped together into a database transaction. Traditionally, a database provides transaction atomicity consistency, isolation, and durability. These properties are known by the acronym ACID. In some implementations, a DBMS provides all of the ACID properties. However, in some implementations, the DBMS does not provide all of the ACID properties.

In some implementations, one or more clients devices 120, e.g., instances of the computing system 901, are in communication with the DBMS, e.g., via a direct link or via the network 130. In some implementations, one or more of the clients obtain data from the DBMS using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more of the clients obtain data from the DBMS using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more of the clients obtain data from the DBMS using natural language or semantic queries. In some implementations, one or more of the clients obtain data from the DBMS using queries in a custom query language such as a Visualization API Query Language. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 902). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer executable instructions, in a non-transitory form.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

What is claimed is:

1. A method of configuring an animated content item based on a position of the animated content item within a viewport of a computing device upon which the animated content item is presented, the method comprising:

providing, to a first computing device, an animation configuration interface configured to allow selection via the first computing device of a position-dependent setting during a scroll event, the position-dependent setting based on a first slider set point comprising a first position within the viewport at which a property of the animated content item begins and a second slider set point comprising a second position within the viewport at which the property of the animated content item ends;

obtaining, via the first computing device, data indicative of a user input corresponding to:
  dragging the first slider set point to select the first position of the animated content item within a viewport at which one or more animations of the animated content item begins the property; and
  dragging the second slider set point to select the second position of the animated content item within the viewport at which one or more animations of the animated content item ends the property; and providing, to a second computing device, the position-dependent setting triggered by a position of the animated content item within the viewport of the second computing device, wherein the position-dependent setting causes the second computing device to begin the property of the animated content item when the animated content item reaches the first position and end the property of the animated content item when the animated content item reaches the second position.

2. The method of claim 1, wherein the animation configuration interface is configured to allow selection of a second position-dependent setting based on another slider set point.

3. The method of claim 2, wherein the second position-dependent setting comprises the second position within the viewport at which an animation ends.

4. The method of claim 3, wherein configuring the property of the animated content item comprises causing the animation of the animated content item to change as the animated content item moves through the viewport between the first position and the second position.

5. The method of claim 4, wherein the animation configuration interface is configured to allow selection of a third position-dependent setting comprising a third position within the viewport.

6. The method of claim 1, wherein a sliding interface allows sliding of a coordinate value associated with the first slider set point in the viewport at which the property of the animated content item changes, and wherein a percentage input allows input of a percentage value associated with a reference point in the viewport at which the property of the animated content item changes.

7. The method of claim 1, wherein the animation configuration interface comprises a graphical representation of a position of the animated content item within the viewport, the graphical representation being movable to select the position within the viewport at which the property of the animated content item changes.

8. The method of claim 1, wherein the property comprises a rotation of the animated content item.

9. The method of claim 8, wherein the position-dependent setting comprises a position within the viewport at which rotation of the animated content item begins.

10. The method of claim 9, wherein the animation configuration interface is configured to allow selection of a second position within the viewport at which the rotation of the animated content item ends.

11. The method of claim 1, wherein the animated content item comprises either an image animation or a video animation.

12. The method of claim 1, further comprising receiving, by a third computing device, the position-dependent setting and configuring the property of the animated content item based on the position-dependent setting such that the animated content item is configured to change the property when presented within a viewport of the third computing device at the position of the viewport in accordance with the position-dependent setting.

13. The method of claim 1, further comprising:
determining a position of the animated content item relative to the viewport of the second computing device;
determining that the position of the animated content item relative to the viewport matches the position of the viewport in accordance with the position-dependent setting; and
changing the property of the animated content item.

14. The method of claim 1, wherein the property includes a value that is interpolated based on the position of the animated content item within the viewport.

15. The method of claim 1, comprising:
determining a plurality of positions of the animated content item relative to the viewport;
determining the animated content has reached the first position corresponding to the first slider set point;
in response to determining the animated content item has reached the first position, causing the property to begin;
determining a plurality of positions of the animated content item relative to the viewport;
determining the animated content has reached the second position corresponding to the second slider set point; and
in response to determining the animated content item has reached the first position, causing the property to end.

16. A system comprising:
at least one computing device operably coupled to at least one memory and configured to:
provide, to a first computing device, an animation configuration interface configured to allow selection via the first computing device of a position-dependent setting during a scroll event, the position-dependent setting based on a first slider set point comprising a first position within a viewport at which a property of an animated content begins and a second slider set point comprising a second position within the viewport at which the property of the animated content item ends;
obtain, via the first computing device, data indicative of a user input corresponding to:
dragging the first slider set point to select the first position of the animated content item within a viewport at which one or more animations of the animated content item begins the property; and
dragging the second slider set point to select the second position of the animated content item within the viewport at which one or more animations of the animated content item ends the property; and
provide, to a second computing device, the position-dependent setting triggered by a position of the animated content item within the viewport of the second computing device, wherein the position-dependent setting causes the second computing device to begin the property of the animated content item when the animated content item reaches the first position, and end the property of the animated content item when the animated content item reaches the second position.

17. The system of claim 16, wherein the animation configuration interface is configured to allow selection of a second position-dependent setting based on another slider set point.

18. The system of claim 16, wherein the animation configuration interface is configured to allow selection of a third position-dependent setting.

19. The system of claim 16, wherein the animated content item comprises either an image animation or a video animation.

20. One or more non-transitory computer-readable storage media having instructions stored thereon that, when executed by at least one processor, cause the at least one processor to perform operations comprising:
receiving, by a first computing device from a content management system, an animation configuration interface configured to allow selection of a position-dependent setting during a scroll event, the position-dependent setting based on a first slider set point comprising a first position within a viewport at which a property of an animated content item begins and a second slider set point comprising a second position within the viewport at which the property of the animated content item ends;
obtaining, via the first computing device, data indicative of a user input corresponding to:
dragging the first slider set point to select the first position of the animated content item within a viewport at which one or more animations of the animated content item begins the property; and
dragging the second slider set point to select the second position of the animated content item within the viewport at which one or more animations of the animated content item ends the property; and
providing, to a second computing device, the position-dependent setting triggered by a position of the animated content item within the viewport of the second computing device, wherein the position-dependent setting causes the second computing device to begin the property of the animated content item when the animated content item reaches the first position, and end the property of the animated content item when the animated content item reaches the second position.

21. The one or more non-transitory computer-readable storage media of claim 20, further comprising instructions that, when executed by the at least one processor, cause the at least one processor to allow selection of a plurality of properties of the animated content item associated with the position-dependent setting comprising a first and second position within the viewport at which the plurality of properties of the animated content item changes.

22. The one or more non-transitory computer-readable storage media of claim 20, further comprising instructions that, when executed by the at least one processor, cause the at least one processor to:
select a second position-dependent setting comprising the second position within the viewport;
select a third position-dependent setting comprising a third position within the viewport; and
select a fourth position-dependent setting comprising a portion position within the viewport.

* * * * *